(12) United States Patent
McCloskey et al.

(10) Patent No.: US 11,319,161 B2
(45) Date of Patent: May 3, 2022

(54) RADIAL STACKER WITH ANGLE CONTROL

(71) Applicant: McCloskey International Limited, Keene (CA)

(72) Inventors: James Paschal McCloskey, Keene (CA); Al Nottingham, Keene (CA)

(73) Assignee: McCloskey International Limited, Keen (CA)

( * ) Notice: Subject to any disclaimer, the term of this patent is extended or adjusted under 35 U.S.C. 154(b) by 0 days.

(21) Appl. No.: 16/896,287

(22) Filed: Jun. 9, 2020

(65) Prior Publication Data

US 2020/0299067 A1  Sep. 24, 2020

Related U.S. Application Data

(60) Division of application No. 16/371,914, filed on Apr. 1, 2019, now Pat. No. 10,683,177, which is a continuation-in-part of application No. 16/215,851, filed on Dec. 11, 2018, now Pat. No. 10,414,599, which is a continuation-in-part of application No. 15/985,353, filed on May 21, 2018, now Pat. No. 10,414,598, which is a continuation-in-part of application No. 15/640,134, filed on Jun. 30, 2017, now Pat. No. 10,011,443.

(Continued)

(51) Int. Cl.
*B65G 19/04* (2006.01)
*B65G 41/00* (2006.01)
*B65G 67/60* (2006.01)

(52) U.S. Cl.
CPC .......... *B65G 41/008* (2013.01); *B65G 19/04* (2013.01); *B65G 41/002* (2013.01); *B65G 67/606* (2013.01); *B65G 2201/04* (2013.01)

(58) Field of Classification Search
None
See application file for complete search history.

(56) References Cited

U.S. PATENT DOCUMENTS

| 4,135,614 A | 1/1979 | Penterman et al. |
| 4,345,680 A | 8/1982 | Kay |

(Continued)

FOREIGN PATENT DOCUMENTS

| CA | 3035463 | 4/2018 |
| CA | 3006665 | 9/2018 |

(Continued)

*Primary Examiner* — Kavel Singh
(74) *Attorney, Agent, or Firm* — Schwabe, Williamson & Wyatt, P.C.

(57) ABSTRACT

Embodiments disclosed herein include a portable radial stacker for stockpiling bulk material. The stacker may include a linear conveyor having a rear portion including a hopper, and a front portion, the conveyor being designed to carry bulk material along an elevating path from a low position adjacent the rear portion to a higher position adjacent the front portion. The hopper may be pivotally mounted to the conveyor at a pivot point, with at least one hopper arm extending between the hopper and the conveyor rearward of the pivot point. The at least one hopper arm may include at least one hopper hydraulic cylinder to extend and retract the effective length of the hopper arm to raise and lower a rear end of the hopper to modify a degree of elevation of the hopper.

11 Claims, 24 Drawing Sheets

Related U.S. Application Data

(60) Provisional application No. 62/427,091, filed on Nov. 28, 2016.

(56) References Cited

U.S. PATENT DOCUMENTS

| | | | |
|---|---|---|---|
| 4,813,839 | A | 3/1989 | Compton |
| 6,129,196 | A | 10/2000 | Lapper et al. |
| 6,471,031 | B1 * | 10/2002 | Duncalf ................ B65G 67/24 198/313 |
| 7,223,059 | B2 * | 5/2007 | Smith ................ B65G 41/002 198/315 |
| 8,123,019 | B2 | 2/2012 | Johannsen |
| 10,183,811 | B1 | 1/2019 | McClsokey et al. |
| 2012/0048674 | A1 | 3/2012 | Smith et al. |
| 2013/0048465 | A1 | 2/2013 | Friesen |
| 2017/0327024 | A1 | 11/2017 | Ozinga |
| 2018/0148280 | A1 | 5/2018 | McCloskey et al. |

FOREIGN PATENT DOCUMENTS

| | | |
|---|---|---|
| CA | 2985907 | 12/2018 |
| CN | 204823276 | 12/2015 |
| EP | 2883819 A1 | 6/2015 |
| GB | 2478824 A | 9/2011 |
| JP | 64-51585 | 3/1989 |
| WO | 2011/151378 A1 | 12/2011 |
| WO | 20120167694 | 12/2012 |
| WO | 2017-027605 | 2/2017 |

* cited by examiner

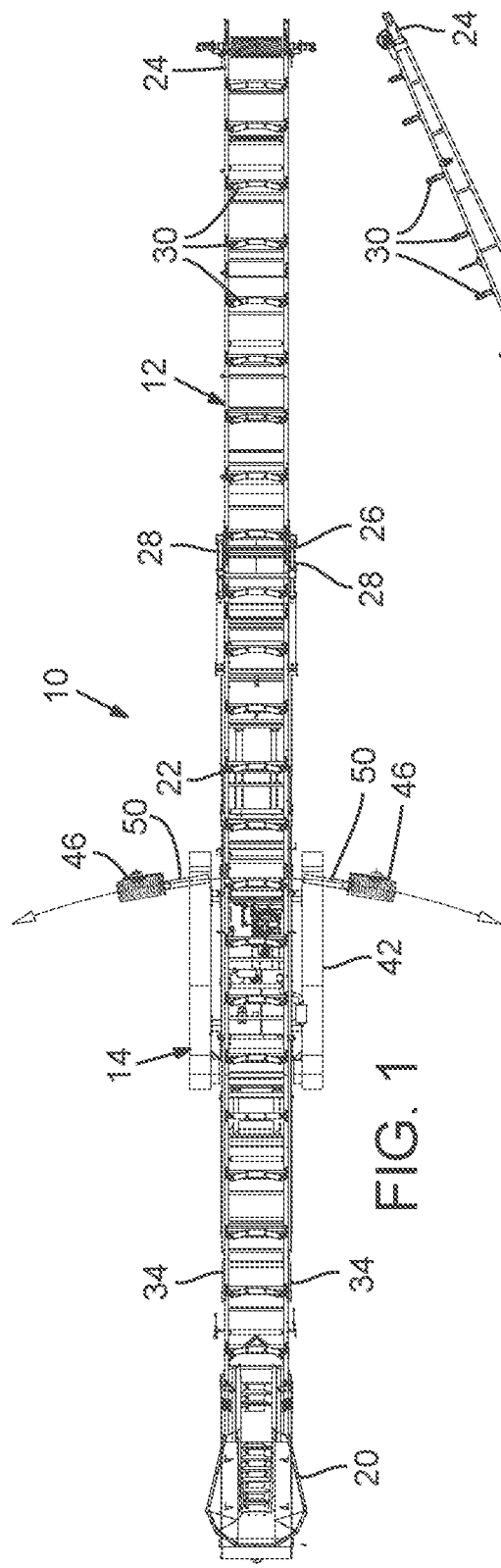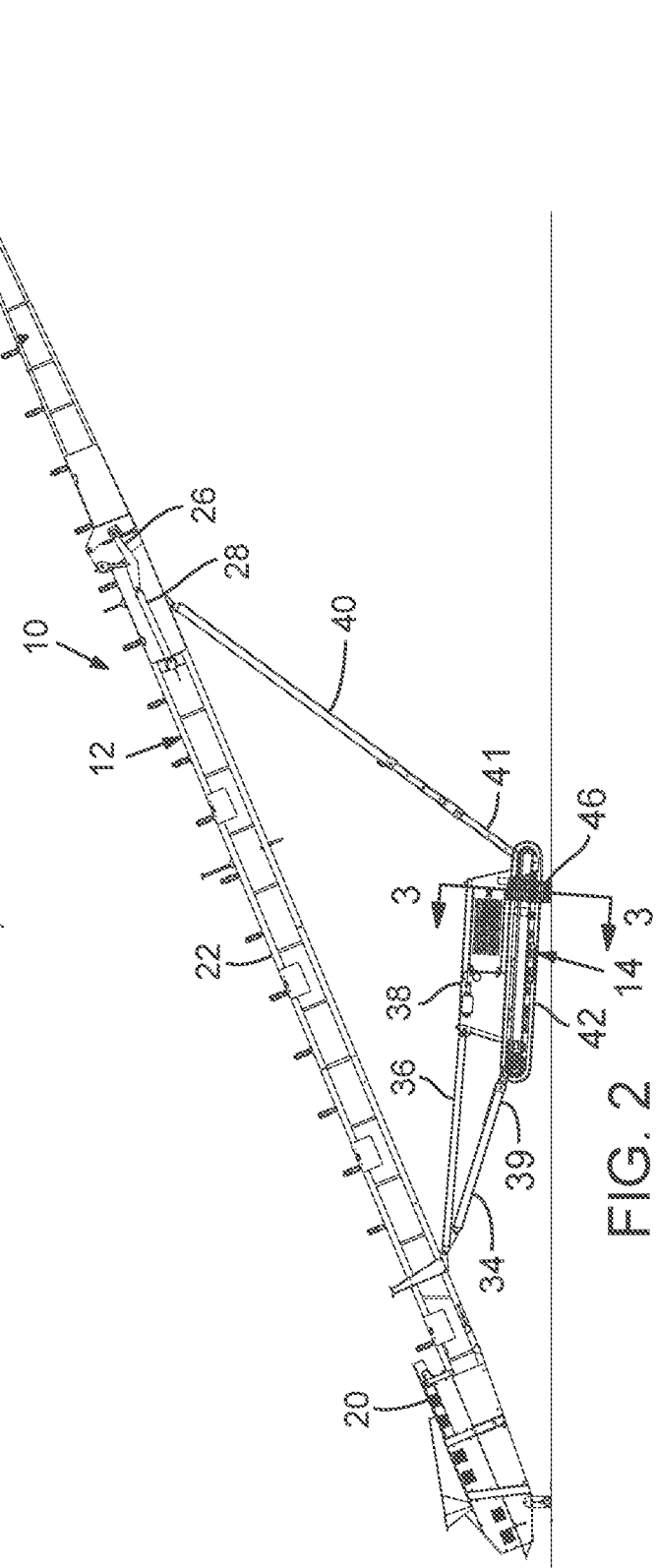

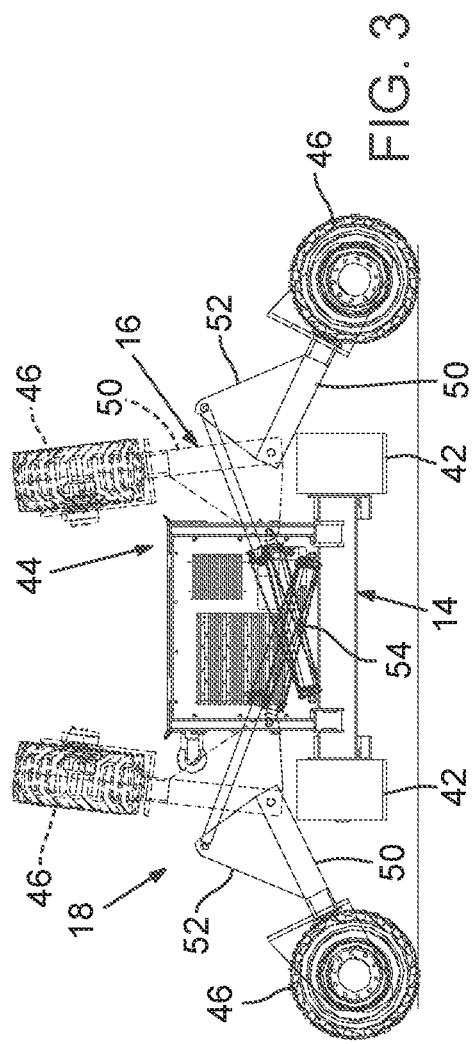
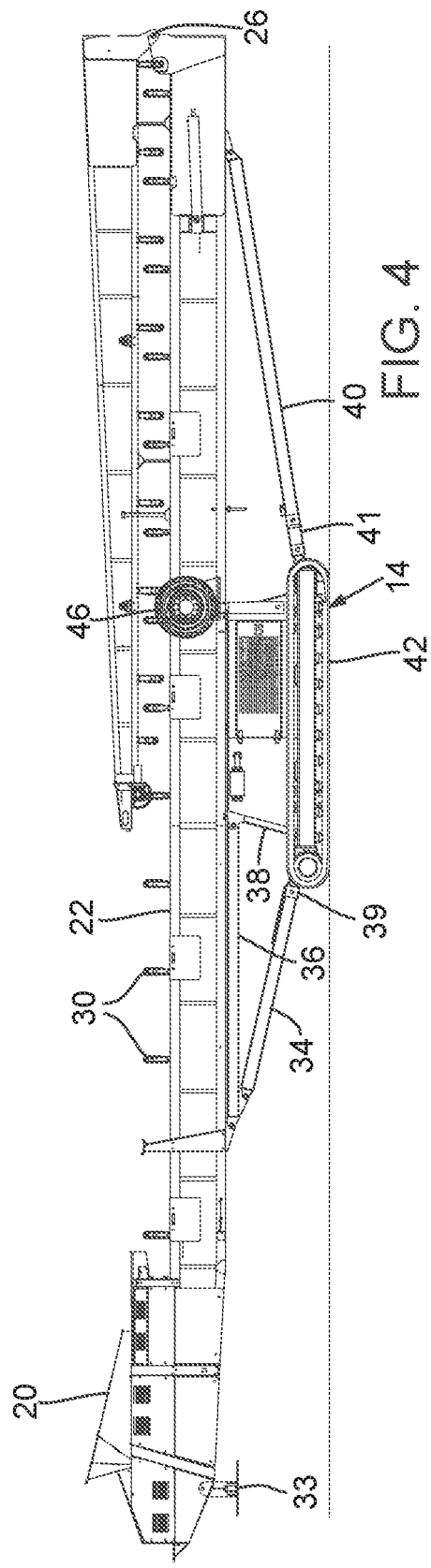

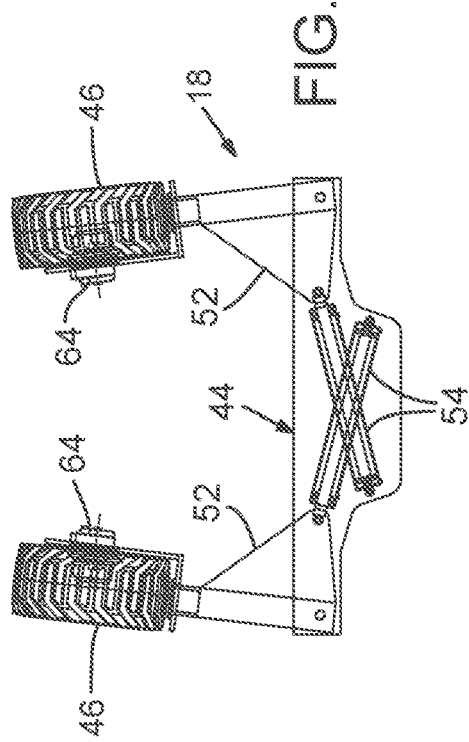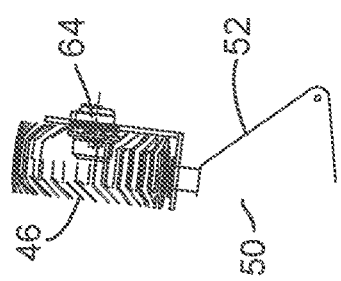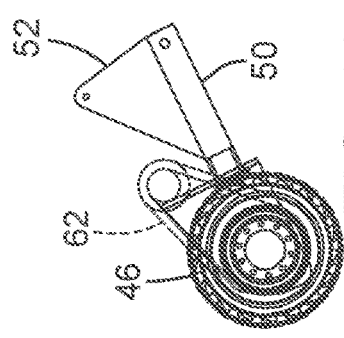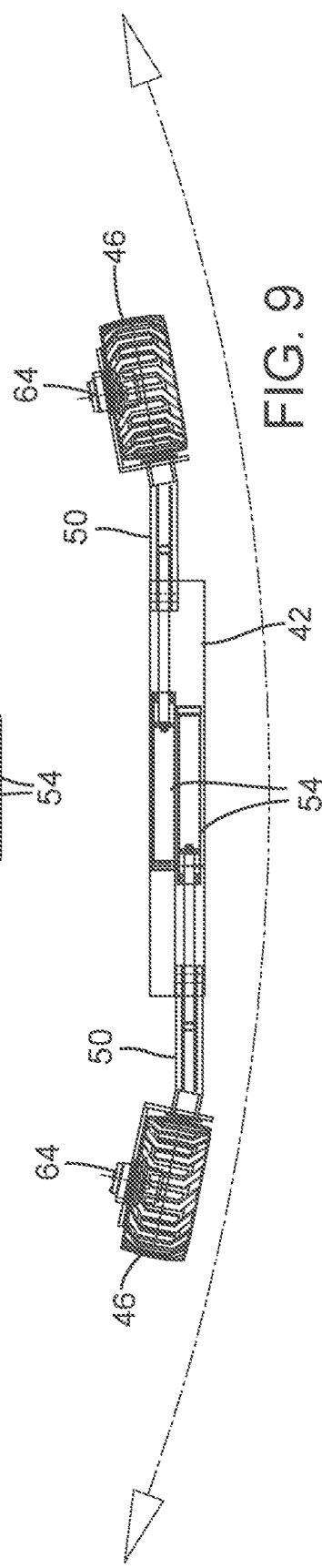

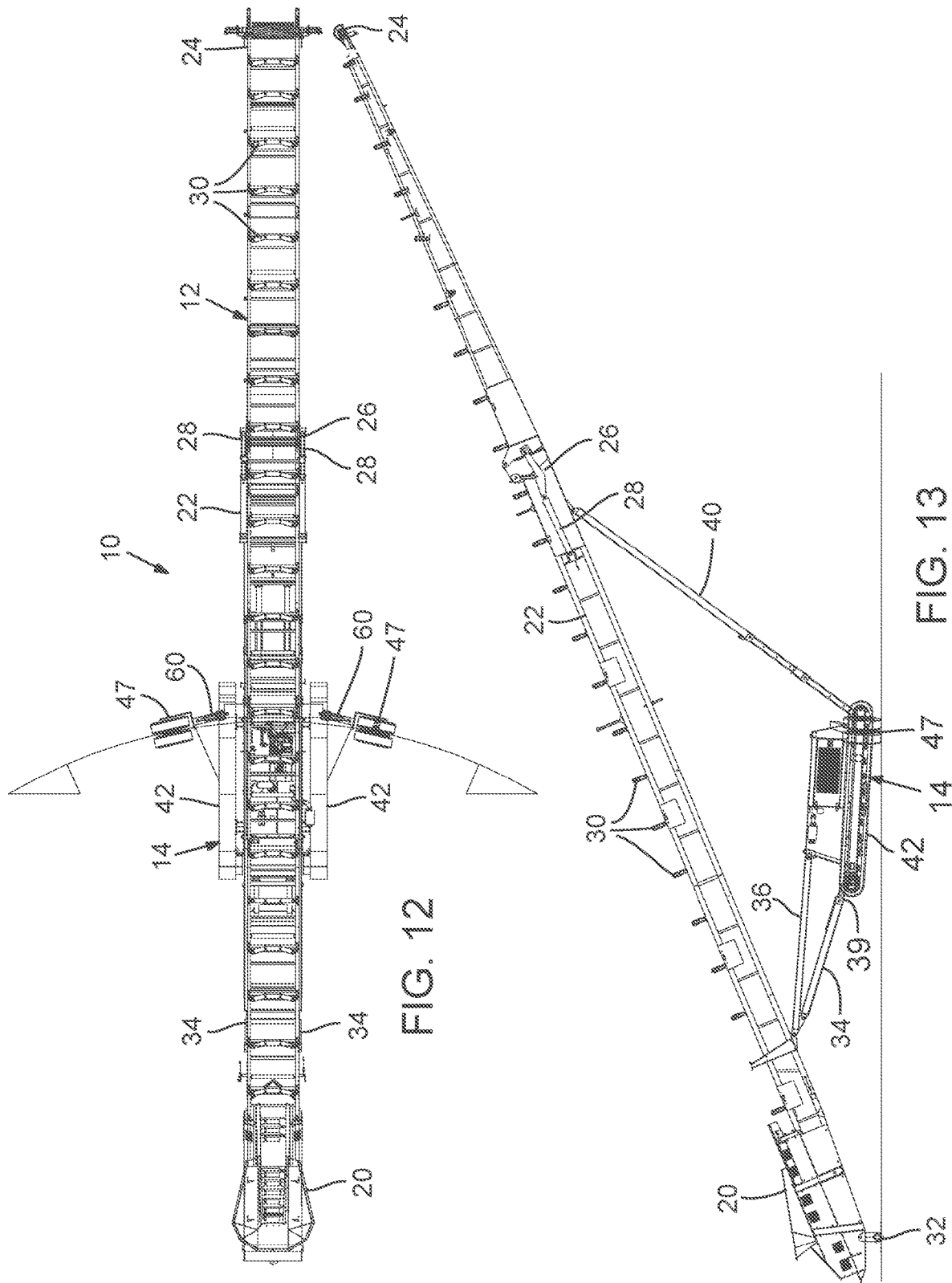

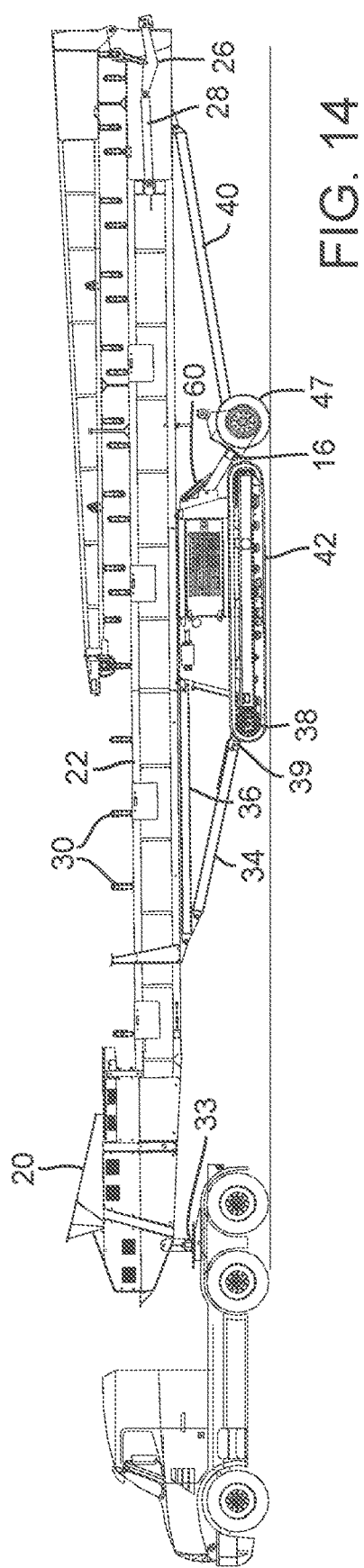
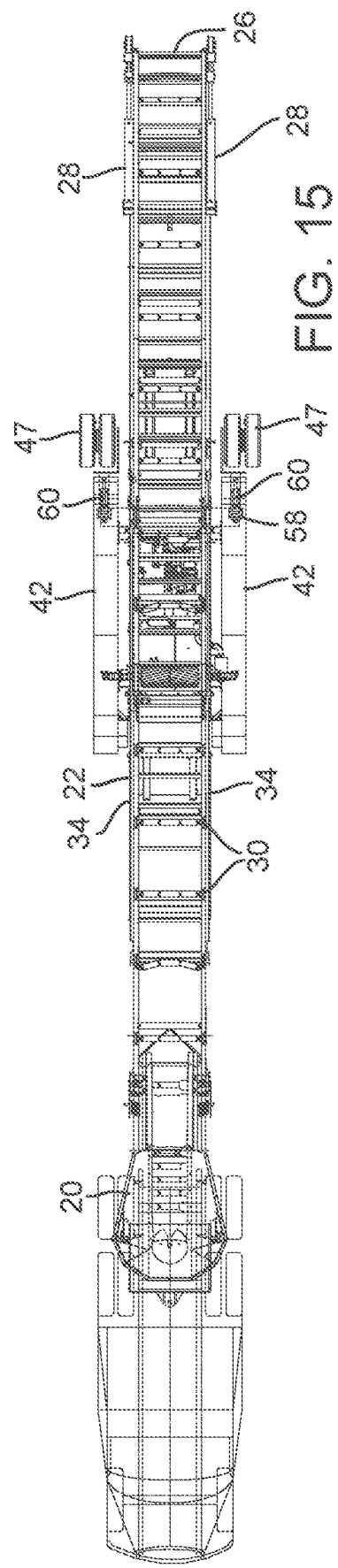

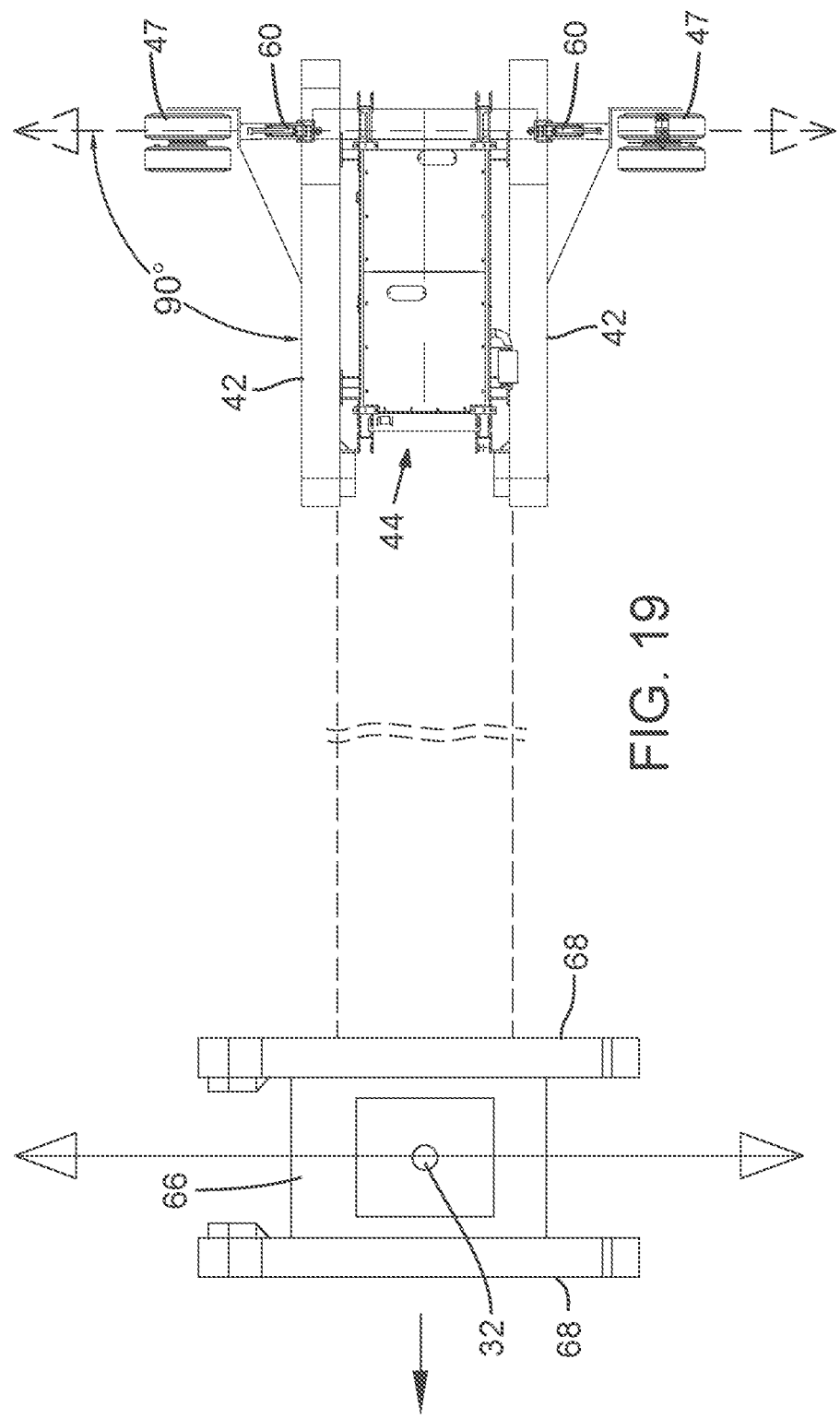

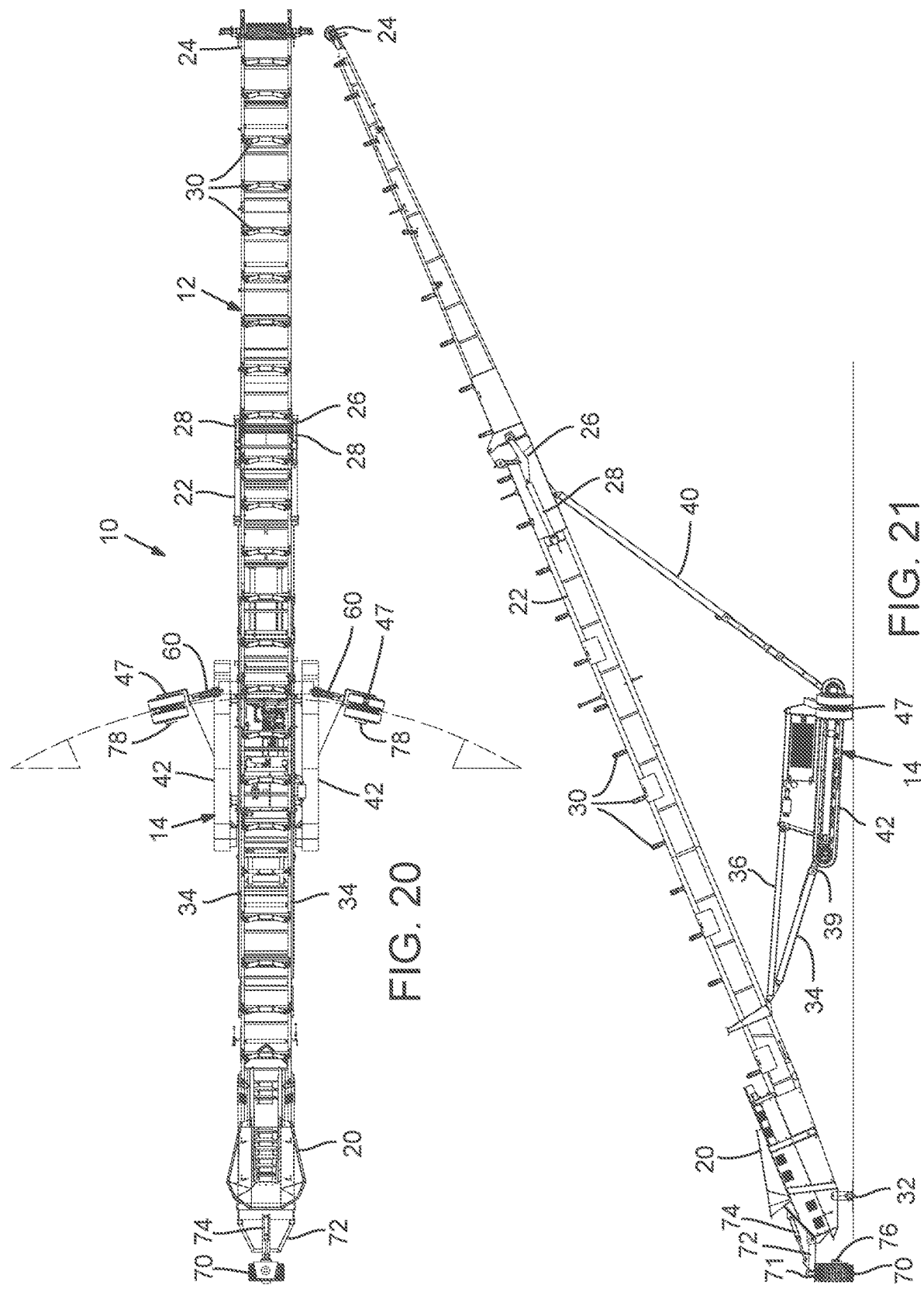

RADIAL STACKER WITH ANGLE CONTROL

CROSS REFERENCE TO RELATED APPLICATIONS

The present application is a divisional of U.S. Non-application Ser. No. 16/371,914 which is a continuation-in-part of U.S. Nonprovisional application Ser. No. 16/215,851, which is a continuation-in-part of U.S. Nonprovisional application Ser. No. 15/985,353, claiming priority to U.S. Provisional Patent Application No. 62/427,091, filed Nov. 28, 2016, and U.S. Non-provisional patent application Ser. No. 15/640,134, filed Jun. 30, 2017, now U.S. Pat. No. 10,011,443 entitled "Tracked Radial Stacker with Wheels," the entire disclosures of which is incorporated by reference.

TECHNICAL FIELD

Embodiments herein relate to belt-type conveyors for conveying bulk material from a screening or crushing plant to a location where such material is stacked.

BACKGROUND

Portable radial stackers have been used for many years to stack bulk materials such as aggregate for road construction, grain, coal, and mulch. Radial stackers, which swing around in a radius to stack material in an arc, permit substantially more material to be stacked than is possible using a conventional stationary stacker that permits only a conical stack. Telescoping radial stackers permit even more material to be stacked as the stacker is extended or retracted during conveying operations.

Radial stackers typically include a wheeled axle disposed between a hopper and the top of the stacker from which the material is discharged. These wheels permit the stacker to be swung in an arc, with the hopper including a pivot plate on which the stacker pivots.

An additional advantage of having a wheeled radial stacker is that the stacker may be folded over itself and be ready for road transport in relatively little time, as the wheels that are used for radial travel can be displaced into a position aligned with the stacker to support the stacker for travel.

In recent years, tracked drives have been used in quarries, agricultural and mining operations to enable equipment to be moved over harsh terrain for ideal positioning for stacking operations. While tracked vehicles have proven to be of great benefit for such purposes, the use of tracks instead of wheels makes it more difficult to shift a stacker radially to facilitate the stacking of material in an arc instead of a cone. Also, because tracked vehicles are not typically permitted to be driven on road surfaces, they are normally loaded onto flatbed trucks for transit from one work site to another. These two drawbacks with the use of tracks has to a certain extent limited the use of tracked vehicles.

While portable radial stackers are extremely versatile in that they can operated on a wide variety of terrain and in a variety of conditions, certain materials to be stacked create unique problems. Given the requirement that stacking conveyors need to be able to stack in large, high piles, it is necessary that the angle of inclination of the conveyor be relatively steep, often as steep as 25 degrees or more. This is also true when the conveyors are being used to load ships that might be riding high in the water.

While the inclination issue may not be a problem with some bulk materials that exhibit a high degree of friction on the conveyor belt, other materials such as river rock and salt do not exhibit such friction. Special conveyor belts bearing ribs or other friction-increasing features may be used to convey such low-friction materials but this may require removal and replacement of the belt, which is not an easy task to complete on site. It is also necessary that conveyors be able to operate in a wide variety of weather conditions, such as rain, snow and ice. Bulk materials that can be conveyed at a steep angle when dry might be more difficult to convey in the presence of moisture or winter conditions. While the angle of inclination is adjustable in most portable radial conveyors, reducing the angle of inclination will often substantially reduce the size or height of the piles into which the stacker can deposit bulk material.

BRIEF DESCRIPTION OF THE DRAWINGS

Embodiments will be readily understood by the following detailed description in conjunction with the accompanying drawings and the appended claims. Embodiments are illustrated by way of example, and not by way of limitation, in the figures of the accompanying drawings.

FIG. 1 is a top plan view of an embodiment with mid-wheels in a lowered position, ready for radial repositioning of the stacker;

FIG. 2 is a side elevation view of the embodiment of FIG. 1, showing the mid-wheels in a lowered position in contact with the ground and with the tracks elevated off the ground;

FIG. 3 is an end elevation view of a portion of the embodiment of FIG. 1 taken along line 3-3 of FIG. 2, showing the mid-wheels in a lowered position and, in phantom, in a raised position;

FIG. 4 is a side elevation view of the embodiment of FIG. 1, showing the mid-wheels in a raised position and the tracks supporting the stacker, with the stacker collapsed over itself for travel around the job site or elsewhere;

FIG. 8 is an end elevation view of a portion of the embodiment of FIG. 1, corresponding to FIG. 7, showing the position of the mid-wheels being controlled by hydraulic cylinders but in their raised position elevated from the ground, and rotated 90 degrees;

FIG. 9 is a fragmentary top plan view of the embodiment of FIG. 1 corresponding to FIG. 7 with the mid-wheels in their lowered position, ready for radial repositioning of the stacker, with the mid-wheels being powered by a hydraulic planetary drive;

FIG. 10 is a fragmentary end elevation view corresponding to that of FIG. 7 showing a single mid-wheel, with the mid-wheel being chain-driven;

FIG. 11 corresponds to that of FIG. 10 except that instead of a chain drive, it shows a hydraulic planetary drive;

FIG. 12 is a top plan view showing a slightly different, double-wheeled embodiment, with the mid-wheels in their lowered position, ready for radial repositioning;

FIG. 13 is a side elevation view corresponding to FIG. 12, with the mid-wheels in their lowered position and the track elevated off the ground, ready for radial repositioning;

FIG. 14 is a side elevation view of the embodiment of FIG. 12 with the mid-wheels in their lowered, longitudinal position supporting the tracks above the road for travel, and with the rear end mounted to a tractor fifth wheel;

FIG. 15 is a top plan view corresponding to FIG. 14;

FIG. 19 is a fragmentary top plan view of the embodiment of FIG. 12 with the double mid-wheels in a lowered, 90 degree lateral position showing a tracked bogie disposed below the hopper, ready to move the stacker in a lateral direction.

FIG. 20 is a top plan view of another embodiment that includes a rear wheel, here shown extending laterally;

FIG. 21 is a side elevation view of the embodiment of FIG. 20, also showing the rear wheel extending laterally and in its lowered position;

FIG. 35 shows the stacker in a transport mode; FIG. 36 shows the stacker in a mode with the rear legs fully retracted and the conveyor at a moderate degree of elevation; FIG. 37 shows the stacker in a mode with the rear legs fully extended and the conveyor at a moderate degree of elevation; and FIG. 38 shows the stacker with the rear leg fully extended and the conveyor at a moderate angle of elevation.

DETAILED DESCRIPTION OF DISCLOSED EMBODIMENTS

Figure 5:
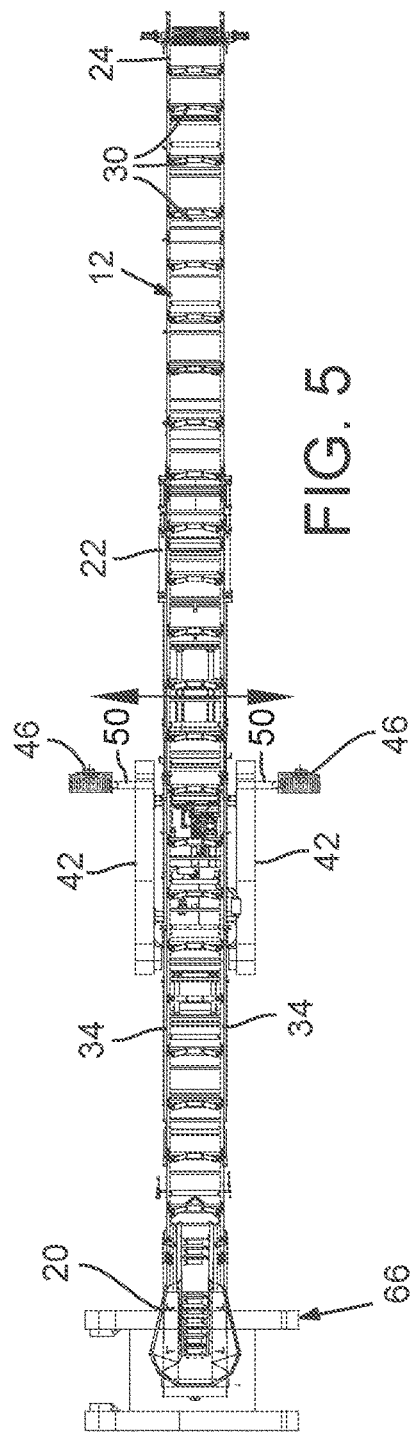
FIG. 5 is a top plan view of the embodiment of FIG. 1, showing the mid-wheels lowered to a 90 degree position for lateral (radial) travel, and including a track system mounted to the hopper for repositioning the entire stacker in a lateral direction.
Figure 6:
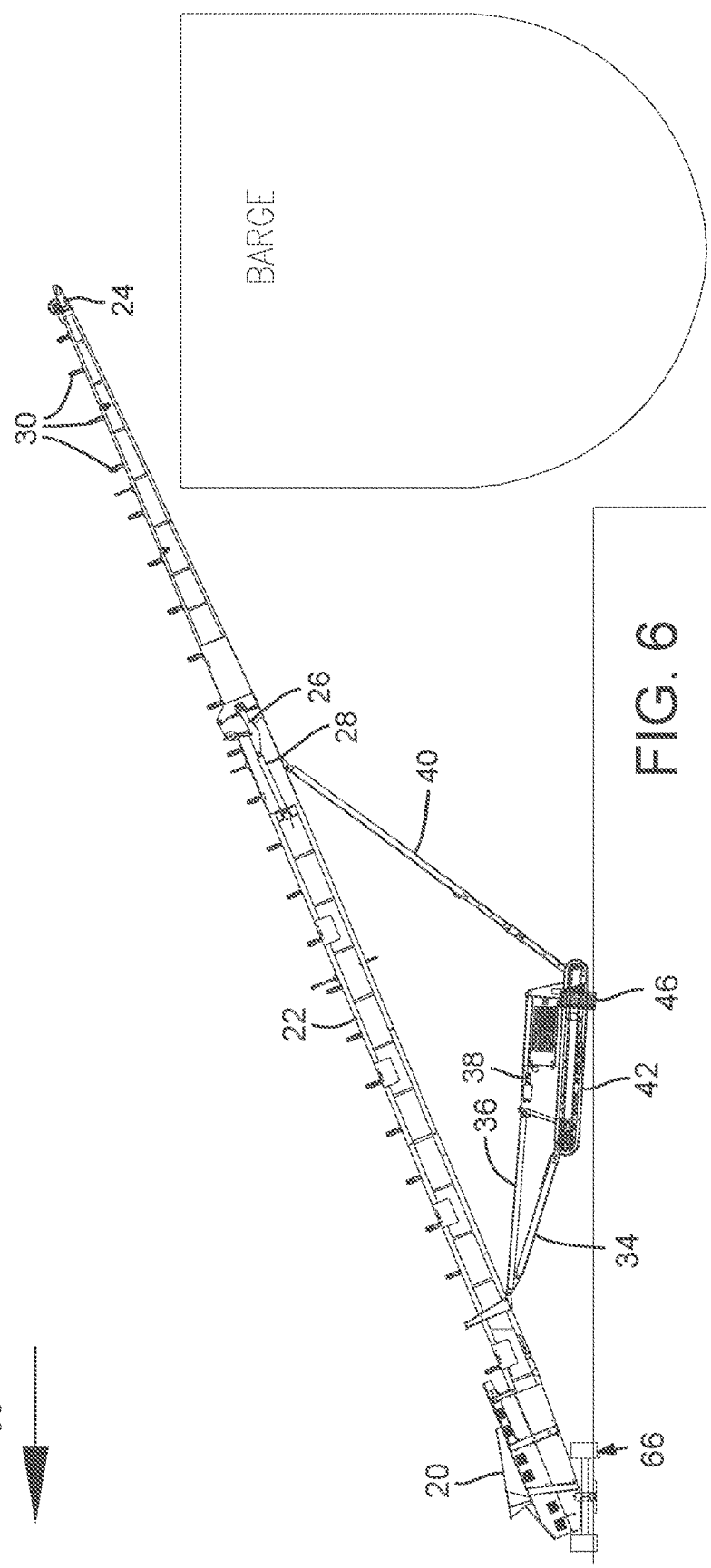
FIG. 6 is a side elevation view of the embodiment of FIG. 1, corresponding with FIG. 5, including a schematic representation of a barge into which the stacker might be loading material as it is laterally moved from one position to another.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments. However, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments disclosed herein include a stacker for stockpiling bulk material. The stacker may include a linear conveyor having a rear portion including a hopper, and a front portion, the conveyor being designed to carry bulk material along an elevating path from a low position adjacent the rear portion to a higher position adjacent the front portion. At least one conveyor leg may extend from the rear portion of the conveyor to the ground, and the at least one conveyor leg may include a conveyor hydraulic cylinder for increasing and decreasing the effective length of the conveyor leg, thereby raising and lowering the rear portion of the conveyor to increase and decrease a degree of inclination of the path. At least one hopper arm may extend from the rear portion of the conveyor to a rear portion of the hopper, and the at least one hopper arm may include a hopper hydraulic cylinder for increasing and decreasing the effective length of the hopper arm. A front portion of the hopper may be pivotally mounted to the conveyor so that the hopper can be pivoted with respect to the conveyor by extending or retracting the hopper hydraulic cylinder and thereby altering the degree of inclination of the hopper.

The stacker may include means for automatically maintaining the hopper in a horizontal disposition regardless of the degree of inclination of the path. This means may control the hopper hydraulic cylinder.

The at least one hopper arm may extend from the conveyor at a point rearward of the at least one conveyor leg. The hopper may be pivotally mounted to the conveyor at a pivot point and the at least one hopper arm may provide the sole support for the hopper rearward of the pivot point. The hopper may be pivotally mounted to the conveyor at a pivot point and the at least one conveyor leg may extend from adjacent the pivot point to the ground.

Embodiments may include a portable radial stacker for stockpiling bulk material. The stacker may have a linear conveyor having a rear portion including a hopper, and a front portion, the conveyor being designed to carry bulk material along an elevating path from a low position adjacent the rear portion to a higher position adjacent the front portion. The hopper may be pivotally mounted to the conveyor at a pivot point, with at least one hopper arm extending between the hopper and the conveyor rearward of the pivot point. The at least one hopper arm may include at least one hopper hydraulic cylinder to extend and retract the effective length of the hopper arm to raise and lower a rear end of the hopper to modify a degree of elevation of the hopper.

The at least one hopper arm may provide the sole means of supporting the rear end of the hopper off the ground.

The stacker may also include at least one conveyor leg extending from the rear portion of the conveyor to the ground, the at least one conveyor leg including a conveyor hydraulic cylinder for increasing and decreasing the effective length of the leg, thereby raising and lowering the rear portion of the conveyor to increase and decrease a degree of inclination of the path. This at least one conveyor leg may provide the sole means of supporting for the rear portion of the conveyor off the ground.

Embodiments may include a stacker for stockpiling bulk material on the ground, the stacker including a linear conveyor having a rear portion and a front portion, being designed to carry bulk material along a path from the rear portion toward the front portion. A hopper may be pivotally mounted to the rear portion of the conveyor, the hopper having a rear portion and a front portion. First angle adjustment means may extend between the rear portion of the hopper and the conveyor to adjust a first inclination angle between the hopper and the conveyor.

The stacker may include second angle adjustment means between the front portion of the hopper and the conveyor to adjust a second inclination angle between the hopper and the ground. The second angle adjustment means also may adjust a third inclination angle between the conveyor and the ground. The second angle adjustment means may extend from the ground to the conveyor and to the hopper. The second angle adjustment means may extend from the ground to the front portion of the hopper. The second angle adjustment means may provide the sole means for supporting the hopper and rear portion of the conveyor off the ground. The first and second angle adjustment means may cooperate to keep the hopper in a horizontal disposition.

A tracked stacker is identified generally at 10 in the figures. FIGS. 1 and 2 show stacker 10 to be ready to be radially shifted (sometimes referred to herein as "lateral movement" or "laterally"). Stacker 10 includes a conveyor, indicated generally at 12, a track system, indicated generally at 14, and a wheel system, indicated generally in FIG. 3 at 16. A system for elevating and lowering stacker 10, indicated generally at 18, is shown in FIG. 3, taken along line 3-3 of FIG. 2.

More specifically, conveyor 12 may include a hopper 20, a main conveyor portion 22 and a discharge end 24. The depicted conveyor includes a joint 26, which may permit the conveyor to double back over itself as shown in FIG. 4 to facilitate road travel. Hydraulic cylinders 28 may be provided at either side of conveyor 12 to facilitate the pivot action and control the position of discharge end 24 relative to main conveyor portion 22. Rollers 30 are typically included to guide a belt, which has been deleted from the figures to better show the features of the conveyor. A pivot point 32 may be provided under hopper 20 to facilitate the radial shifting of the conveyor. Pivot point 32 is typically designed to be readily replaced with a fifth wheel king pin mount 33 (see FIG. 14) to be mounted to a tractor for transport to another site, as will be explained more fully as this discussion continues.

Conveyor 12 is designed to be disposed in various angular positions for various levels of stacking and for transit. This capability may be facilitated by a pair of support frames disposed at each end of main portion 22 of the conveyor. These support frames also help raise and lower track system 14, as will be explained more fully below. Rear support frames 34 extend from track system 14 to the underside of rearward aspect of main portion 22 of the conveyor. Normally, rear support frames 34 will be of telescoping construction. One of the rear support frames 34 may be disposed on each lateral side of conveyor 12 to provide sufficient support and balance to the conveyor. A pair of rear intermediate support frames 36 may also be included, and in the depicted embodiment extend from a track system mounting frame 38 to the underside rear aspect of main portion 22 of the conveyor. Rear intermediate support frames 36 may also be telescoping, but typically are not.

Rear support frames 34 may be provided with hydraulic rams 39 to provide power to reposition the rear support frames and to raise and lower the rear end of conveyor 12 to permit stacker 10 to be repositioned to lower the tracks to the ground and to facilitate mounting of king pin 33 to a fifth wheel of a tractor. Rear support frames 34 may also be provided with pegs and complementing holes (not shown) to fix the support frame in position during operations when the hydraulic rams are not changing the position of the rear support frames.

A pair of front support frames 40 may also be provided to extend from track system 14 to the underside of a forward aspect of main portion 22 of the conveyor. Front support frames 40 are normally telescoping in configuration. One of the front support frames 40 may be disposed on each lateral side of conveyor 12 to provide sufficient support and balance to the conveyor. Front support frames 40 are normally provided with hydraulic rams 41 to provide power to reposition the support frames, and may be provided with pegs and complementing holes (not shown) to fix the support frame in position during operations when the hydraulic rams are not changing the position of the front support frame.

Track system 14 is conventional in that it includes a pair of continuous tracks 42 mounted to track system mounting frame 38. Tracks 42 are driven by an engine through either a mechanical transmission or hydraulic drive. The drive typically provides the capability of reversibility to maximize the maneuverability of the unit.

A bogie 44 for wheel system 16 is shown best in FIG. 3. Wheel system 16 typically includes a pair of wheels 46, although in FIGS. 12-19, in a slightly different embodiment, a pair of coaxial wheels 47 are depicted. However, coaxial wheels 47 will be sometimes described herein as though they are a single wheel. Wheels 46 and 47 will sometimes be referred to herein as mid-wheels since they are generally at a mid-point of the conveyor. Because the embodiment of FIGS. 12-19 is slightly different in the arrangement of the wheels but the rest of the stacker is the same, the numbers for this slightly different embodiment have are not different from the numbers in embodiment 1-11.

When in their lowered, lateral position (ready for either radial or 90 degree displacement of stacker 10) shown in FIGS. 1-3, 5-7, 9, 12-13, 17 and 19, wheels 46 or 47 support tracks 42 in an elevated position. With the wheels in the radial, lateral position, stacker 10 can be driven in a radial direction to provide a second conical stack of bulk material, or to provide additional stacks in an arc. With the wheels in a 90 degree lateral position, and pivot point 32 or king pin 33 mounted to a tracked bogie, such as that shown in FIGS. 5, 6 and 19, the stacks can take the form on a long pile, or the stacker can be used to fill one or more barges, trucks or rail cars. The additional tracked bogie 66 may be used to reposition a stacker for longitudinal displacement by shifting the additional bogie and wheels 47 by 90 degrees if for some reason that is preferable to operating the stacker through longitudinal movement of the tracks 42 of bogie 44.

To provide power drive to wheels 46 or 47, a chain drive 62 may be included as shown schematically in FIG. 10 or a hydraulic planetary drive motor 64 as shown in FIGS. 9 and 11.

After stacker 10 is properly positioned, wheels 46 can be translated to a raised position in which they no longer contact the ground, one of such positions being shown in FIGS. 3 (in phantom) and 8. In this raised position, wheels 46 also may rotate approximately 90 degrees, to the depicted position such that the axes of the wheels extend laterally of stacker 10. This rotation may be effected using hydraulics or some other power means or may be performed manually with pegs and complementing holes (not show).

Figure 18:
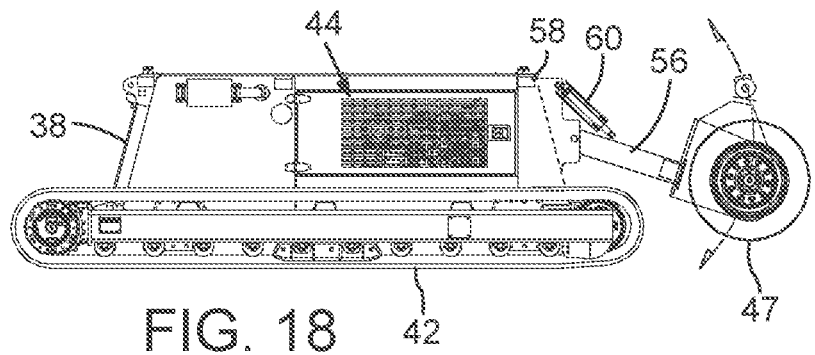
FIG. 18 is a side elevation view of a portion of the embodiment of FIG. 12 with double mid-wheels in their raised position and the track on the ground ready for travel around a job site or elsewhere.

The raised position of wheels 47 is shown in FIG. 18, although they may alternatively be raised from one of their lateral (radial or 90 degree) positions.

When wheels 46 are in their raised positions, tracks 42 contact the ground to ensure maximum maneuverability around the job site. With wheels 46 well up and out of the way as depicted in FIG. 3, there is little risk of the wheels and their tires being damaged despite the rough environment in which the stacker is operating. Wheels 46 are each supported by a leg 50, and are outfitted with a web 52. A hydraulic cylinder 54 extends between each of the two webs 52 of wheels 46 and bogie 44. The pair of hydraulic cylinders 54 maintain the two wheels in their lowered and raised positions, although pegs with complementing apertures (not shown) or other support means may also be included. Hydraulic cylinders 54 may sometimes be referred to herein as a mid-system.

Figure 7A:
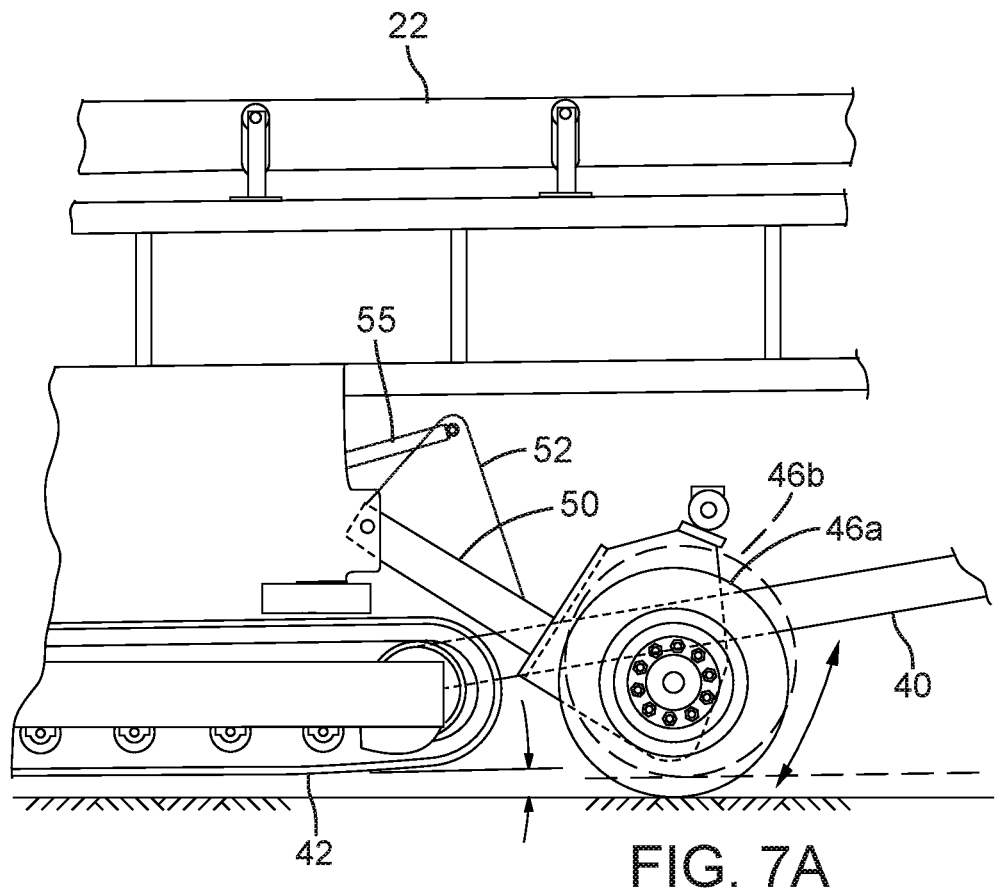
FIG. 7A is a variation of the embodiment of FIGS. 1-11 showing the mid-wheels in a lowered, longitudinal position ready to be shifted longitudinally at the work site or to be driven down a road, with the track lifted off the ground; shown in phantom is one of the mid-wheels in a raised position as might be appropriate to operate the conveyor on uneven terrain.

As shown in FIG. 7A, an additional set of hydraulic cylinders 55 may be included to pivot wheels 46 clockwise from the position shown in FIG. 4 to one in which the wheels contact the ground to raise tracks 42 off the ground. This longitudinal disposition of wheels 46 would to permit stacker 10 to be pulled down the road from one site to another. Shown in phantom in FIG. 7A is an alternate longitudinal position of one of the mid-wheels 46b, which might be appropriate if the stacker was being operated on uneven or inclined terrain.

Figure 7B:
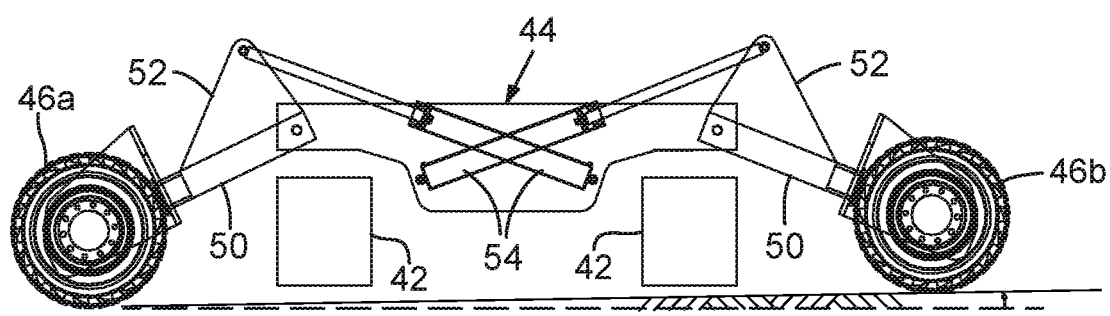
FIG. 7B corresponds to FIG. 7 except that it shows the capability of wheels 46 to be positioned differently in the event the stacker is being operated on terrain that is not level.

FIG. 7B is similar to FIG. 7 except that, like FIG. 7A, shows that in some embodiments the wheels 46a and 46b may be positioned at different lowered positions to facilitate the operation of stacker 10 in uneven terrains. As with the depiction in FIG. 7A, this capability means that the conveyor 12 itself can be positioned with the belt substantially horizontal even those the terrain may be slanted in one direction or the other.

The arrangement shown in FIGS. 12-19 is slightly different in that each wheel 47 includes a slightly different leg 56 that may be mounted to a vertical post 58. Post 58 may be rotatably mounted to bogie 44 so that wheels 47 may be swiveled from the longitudinal positions shown, for example, in FIG. 16, to the radial, lateral position shown in FIG. 17, or the 90 degree, lateral position. This swiveling may be performed manually or may be provided by a hydraulic motor or hydraulic cylinder drive. Wheels 47, legs 56 and posts 58 may also be provided with a hydraulic cylinders 60 for raising and lowering wheels 47.

Figure 16:
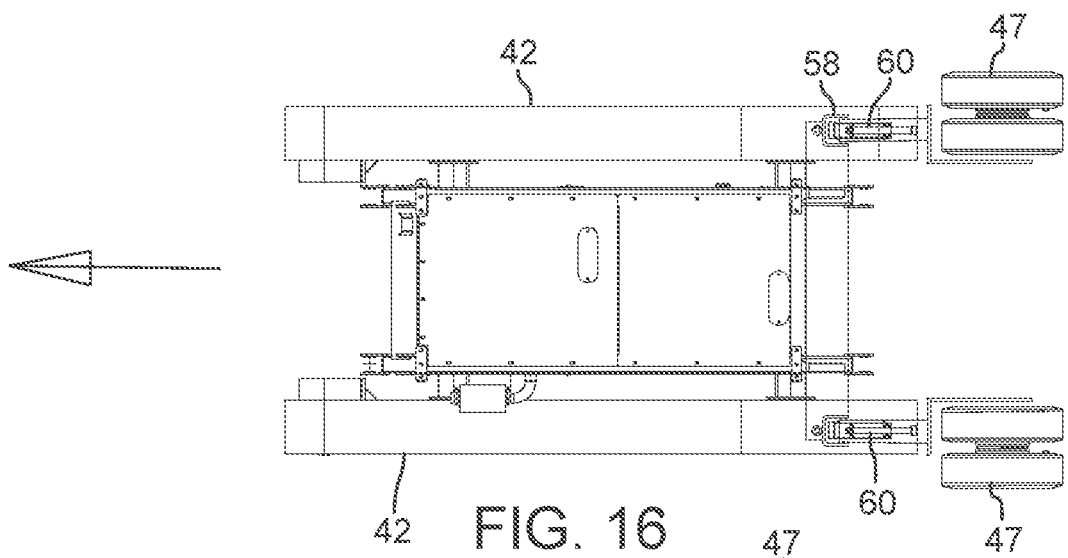
FIG. 16 is a top plan view of a portion of the embodiment of FIG. 12 showing double mid-wheels in their lowered, longitudinal position ready for road travel.
Figure 17:
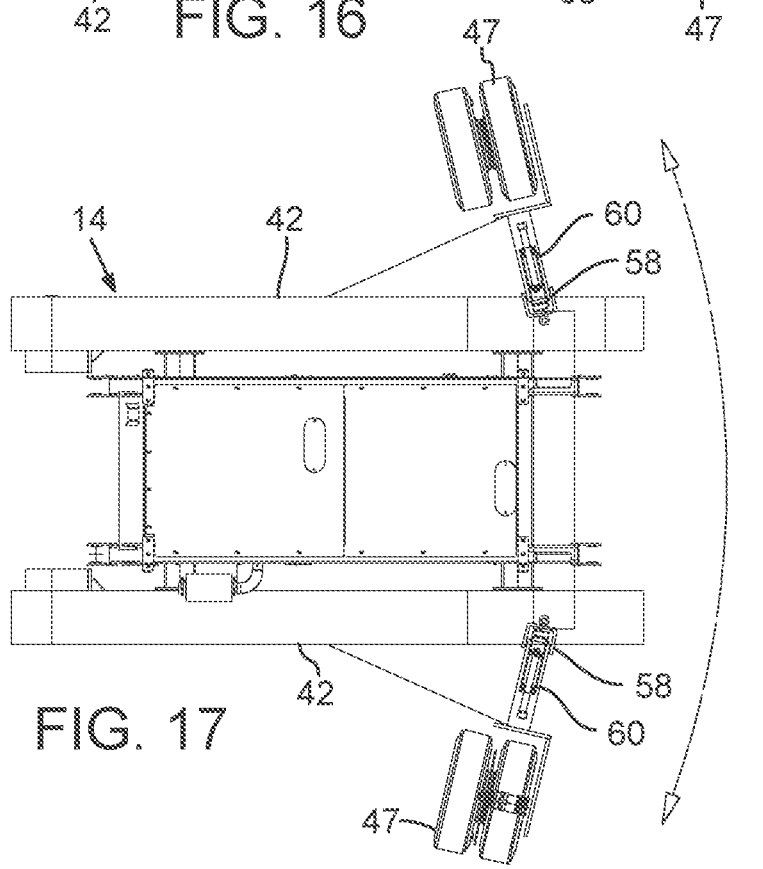
FIG. 17 is a top plan view corresponding to FIG. 16 except that the double mid-wheels are in their lowered position ready for radial displacement of the stacker.
Figure 18A:
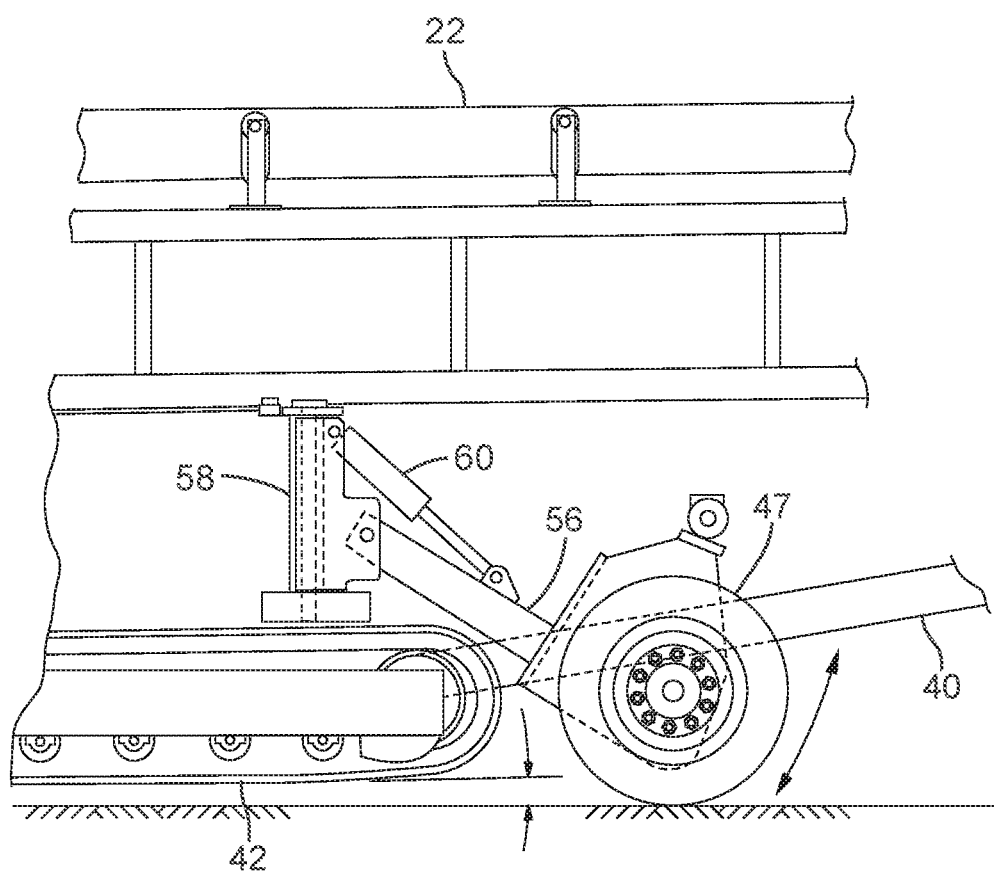
FIG. 18A is an enlarged side elevation view corresponding to FIG. 18 except that the mid-wheels are shown in their lowered, longitudinal position ready for longitudinal displacement down a road or elsewhere.
Figure 22:
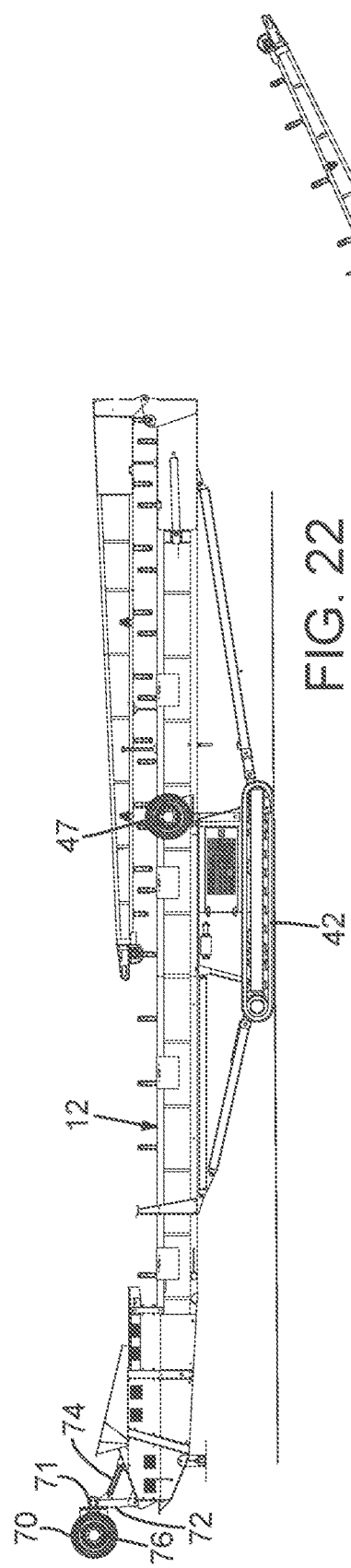
FIG. 22 is a side elevation view of the embodiment of FIG. 20, showing the mid-wheels and the rear wheel in elevated positions with the track contacting the ground, ready for movement around a job site or elsewhere.

Thus, with wheels 47 elevated off the ground as shown in FIG. 18, post 58 may be swiveled to a 90 degree lateral position or to a radial position such as that shown in FIG. 17. Wheels 47 may then be lowered to the ground and, powered by hydraulic cylinders 60, can then raise tracks 42 off the ground. Stacker 10 then is ready to be maneuvered around the job site if wheels 47 are in a lateral position as shown in FIG. 12, 13 or 17 or can be pulled to another site if wheels 47 are in a longitudinal position as shown in FIGS. 16 and 18A. As described earlier, pegs and complementing apertures (not shown), or other fixation systems, might be included to lock the wheels in their lowered or raised positions.

Once the stacker has reached its destination, in order to prepare the stacker for operations, king pin mount 33 would first be disconnected from the fifth wheel of the tractor and would be replaced with pivot point 32. Any positioning pegs or other fixation means in hydraulic cylinders 50 would be removed and wheels 46 would be raised to their position shown in FIG. 4 or 18. This permits tracks 42 to be lowered to the ground so they now support stacker 10. Hydraulic cylinders 28 may then be operated to cause conveyor discharge end 24 to be pivoted from the position shown in FIG. 4, and hydraulic cylinder 41 in front support frames 40 is extended so conveyor 12 takes the position shown in FIGS. 2, 6 and 13.

If it is desired to move stacker 10 radially, either before, after or during this operation to raise the front of the conveyor, wheels 46 may be lowered from the raised position to the lowered position shown in FIG. 3. This may be done by extending hydraulic cylinders 54 until they reach the position depicted in solid lines in FIG. 3. This will raise tracks 42 off the ground as shown in FIG. 2. Or, if the radial position of stacker 12 is where it is desired, wheels 46 may be maintained in their raised position.

During operations, it is up to the operator to decide if the tracks or the wheels are in contact with the ground; that is, whether the wheels are in their raised position with the tracks in contact with the ground or in their lowered position, with the tracks elevated from contact with the ground. It is also up to the operator to decide, if the wheels are down, whether they be in a radial or longitudinal position. In any event, the operator is provided with a number of options.

As mentioned earlier and as shown in FIGS. 7A and 7B, wheels 46 or 47 may also be at somewhat different lowered positions so that stacker 10 will be in a level disposition even if the terrain on which the stacker is operating is not level or perfectly horizontal. In certain circumstances it may even be desired to have one of the wheels 46 or 47 in a lowered position with the other wheel(s) in a raised position off of the ground. The wheels 46 or 47 may take these different positions when they are in either their radial or lateral dispositions or if they are extending longitudinally.

With the embodiment of FIGS. 12-19, to move stacker radially, either before, after or during the unfolding operation of the conveyor, wheels 47 and their legs 56 can be swiveled on posts 58 and then lowered by hydraulic cylinders 54. This will raise tracks 42 off the ground as shown in FIG. 13. Or, if the radial position of stacker 12 is where it is desired, wheels 47 may be maintained in their raised position, depending upon whether the operator wants to perform conveying operations with tracks 42 or wheels 47 on the ground supporting the stacker. When operations are completed and stacker 10 is to be moved to another site, hydraulic cylinders 54 raise legs 56 and wheels 47, posts 58 are swiveled to position wheels 47 longitudinally, and the cylinders can then lower the wheels to the position shown in FIGS. 14, 15 and 18A. Conveyor discharge end 24 is then pivoted through the operation of cylinders 28 to the position shown in FIG. 14 while cylinder 41 lowers that front end of the conveyor. In some instances, cylinders 39 may need to be operated to raise the rear end of conveyor 12 as necessary to facilitate the replacement of pivot point 32 with king pin mount 33, and position stacker 10 on the fifth wheel of the tractor as shown in FIG. 14.

Rear Wheel Embodiment

FIGS. 20-23 depict another embodiment that is different in that it includes a rear wheel 70 and associated support structure. Other than the addition of rear wheel 70, the structure of this embodiment may be the same as the other embodiments. Therefore, the numbers used with the other embodiments have been carried over into FIGS. 20-23.

Rear wheel 70 may be mounted to adjacent the rear portion of stacker 10 by a pair of angularly-extending supports 72, which are pivotally mounted to the stacker so that a hydraulic cylinder 74 can pivot the rear wheel upwardly and downwardly. In its raised position, depicted in FIG. 22, it is up and out of the way. With rear wheel 70 in this position, the stacker may be moved about the work site on tracks 42.

Figure 23:
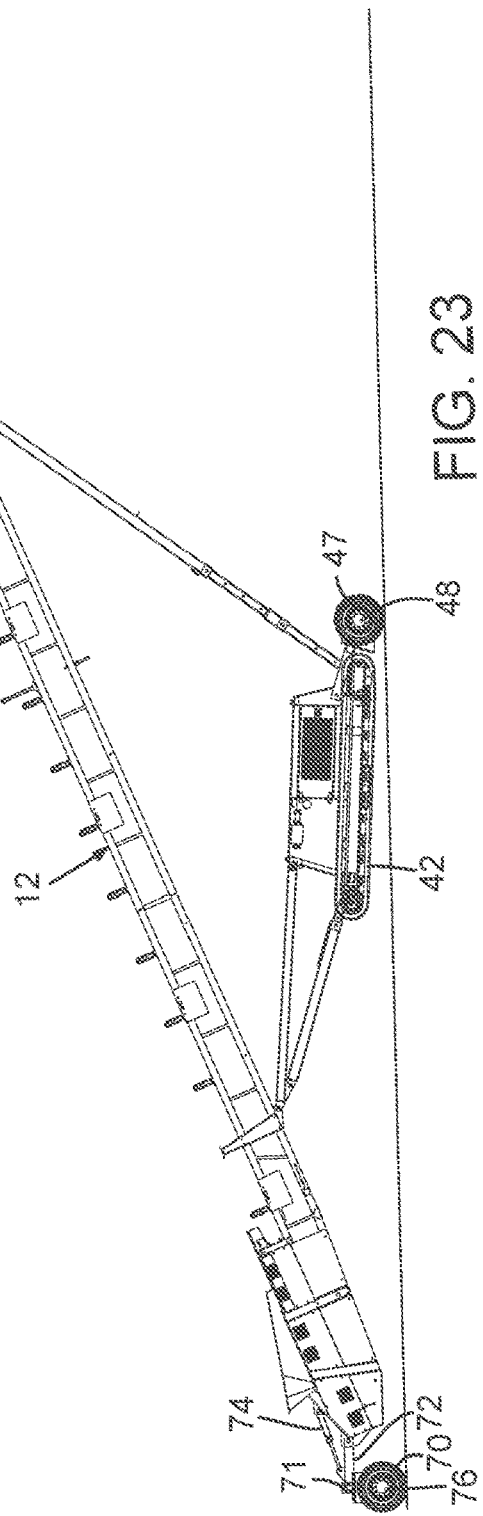
FIG. 23 is a side elevation view of the embodiment of FIG. 20, showing the mid-wheels and the rear wheel in their lowered, longitudinal positions, such as might be used towing the stacker behind a loader for substantial distances around a site.

Hydraulic cylinder 74, sometimes called a "rear system," is designed to selectively shift rear wheel 70 to a lowered position depicted in FIG. 23. As rear wheel 70 is being lowered into this position by hydraulic cylinder 74, pivot point 32 (sometimes called a "foot") is lifted off the ground. Thus, with rear wheel 70 in this lowered position, the stacker 10 may be moved about in a longitudinal direction, with either the tracks 42 or on mid-wheels 47 if they are in their longitudinal disposition shown in FIG. 14, 15, 16, or 18A.

FIG. 23 depicts rear wheel 70 in its lowered, longitudinally disposed position to enable longitudinal movement of the stacker. However, rear wheel 70 may be mounted to swivel with respect to the conveyor 12 to permit it to be translated to a lateral or radial disposition such as is shown in FIGS. 20 and 21. In this lateral disposition, and with wheels 47 (subsequently called mid-wheels to differentiate the rear wheel) in their lateral or radial disposition shown in FIGS. 20 and 21, the stacker may be moved laterally or in a radial arc, depending on the disposition of the mid-wheels. The swiveling capability may be powered by an appropriate hydraulic motor or other means, but the swiveling will normally be manually effected but releasing a lock (not shown) and re-engaging the lock when the swiveling is completed.

As with the earlier embodiments, mid-wheels 46 or 47 may take somewhat different positions if the stacker is on terrain that is not level. This is true whether or not rear wheel 70 is included. As noted earlier, FIGS. 7A and 7B show one of the pair of wheels 46b in a somewhat raised position and the other one of the pair of wheels 46a in a lowered position.

It is preferable that the rear wheel 70 and mid-wheels 47 be provided with means for powering them. This is normally done through hydraulic motors, which are schematically shown at 76 (for the rear wheel) and at 78 (for the mid-wheels). Depending on whether the rear wheel is being driven at the same speed as the mid-wheels, the stacker may be driven strictly to the side (if the wheels are driven at the same speed) or may be moved in a curved path (if the rear wheel is driven more slowly than the mid-wheels). This provides maximum flexibility to the operator in forming piles of bulk material with the stacker.

Adjustable Conveyor Angle Embodiment

FIGS. 24-32 depict another embodiment of the disclosure that provides a system for elevating the rear end of a portable radial stacker. Because most of the components of this conveyor are the same as those of the previously discussed stacker 10, the same numbers will be used for the components of this conveyor except that they will be in the 100 series. The discussion relating to conveyor 10 should be considered incorporated into this discussion since many of the components may be used in each system. So, for example, the stacker has been identified generally with the number 110, the conveyor at 112, and the system for raising and lowering the wheels is identified at 118. The hopper is indicated at 120, the main conveyor portion at 122, the discharge end at 124, and the conveyor joint at 126. The centrally disposed pivot pad is shown at 132. A counter-weight 121 may be mounted at the rear end of stacker 110.

The pairs of rear, intermediate and front support frames for raising and lowering the main portion 122 of the conveyor are shown at 134, 136, and 140, respectively, extending from bogie 144. One of each of the support frames 134, 136, and 140 may be disposed on each lateral side of conveyor 112 to provide sufficient support and balance, even though only one of each of the support frames is show in the side elevation views. The pair of rear support frames 134 may be provided with hydraulic rams 139, and may include pegs and complementing holes (not shown) to fix the support frame in position during operations when the hydraulic rams are not changing the position of the rear support frames. Front support frames 140 typically include hydraulic rams 141 and may also be provided with pegs and complementing holes (not shown).

A pair of continuous tracks 142 and a pair of wheels 146 may also be provided. Wheels 146 will sometimes be referred to herein as mid-wheels since they are generally at a mid-point of the stacker. Wheels 146 are each supported by a leg 150, and a hydraulic cylinder 154 (see FIG. 25) extends between each of the legs and bogie 144. The hydraulic cylinders 154 for changing the position of legs 150 may sometimes be referred to herein as a mid-system.

Stacker 110 performs in the same fashion as stacker 10 except that stacker 110 includes features adjacent the rear, hopper end that may not be present in stacker 10. These features facilitate the elevation and support of the rear portion of conveyor 112. This elevation of the rear portion may permit a reduction in the angle of elevation of the stacker to facilitate the stacker being used to stack river rocks, salt and other low-friction bulk material that might slide down a more steeply inclined conveyor. This elevation of the rear portion of the conveyor will enable the stacker to stack low friction material in a relatively high stack without involving a steep angle of elevation; or at least the angle will be shallower than if the rear portion was in a lower position or was resting on the ground.

Figure 24:
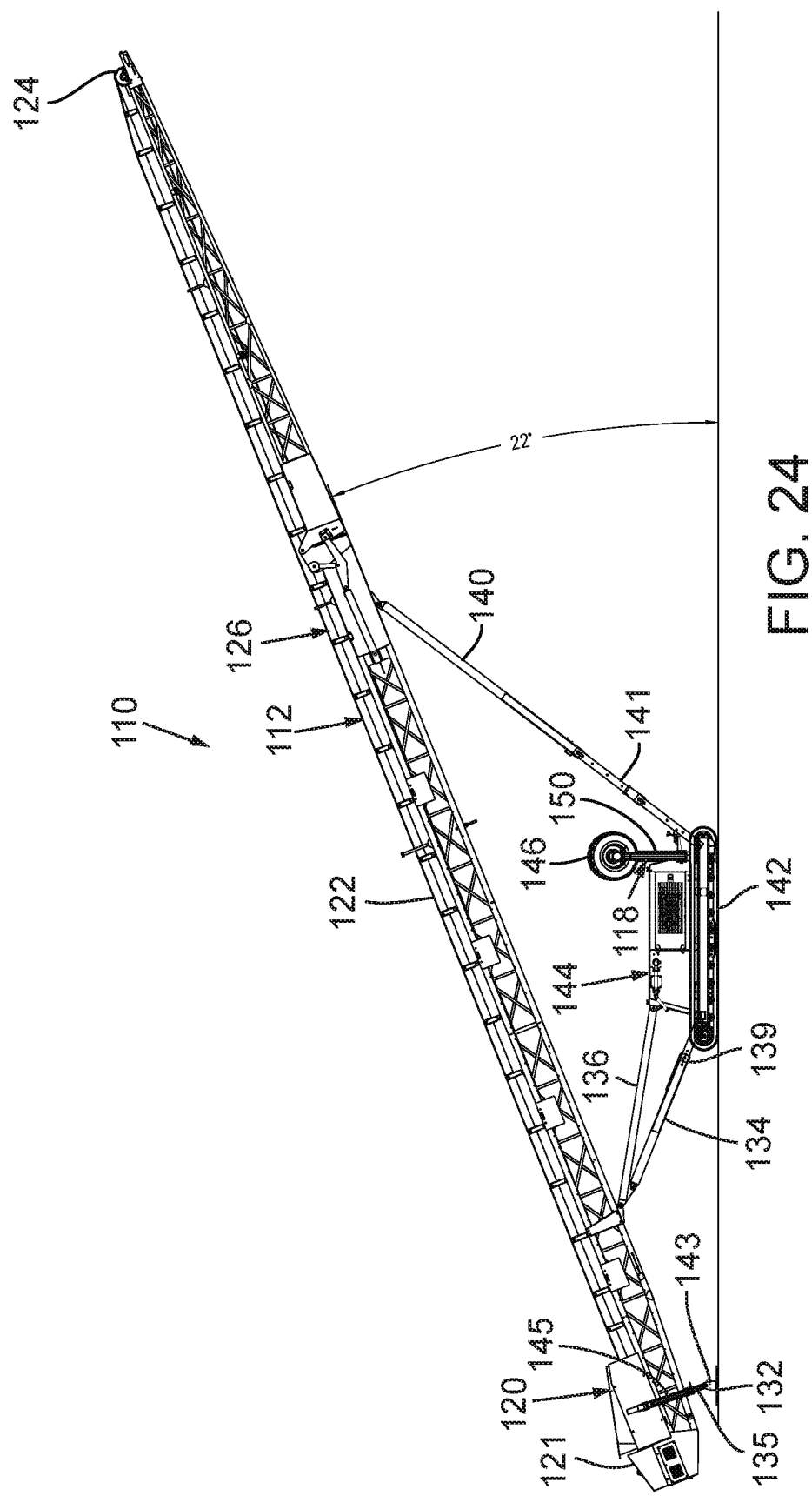
FIG. 24 is a side elevation view of another embodiment, showing the mid-wheels in their raised position with the tracks on the ground.

FIG. 24 shows a stacker 110 being positioned with tracks 142 on the ground and wheels 146 being elevated. Pivot pad 132 includes a pair of extendable, hydraulically actuated legs 135 in a lowered position, with conveyor 112 extending at an angle of 22 degrees. Legs 135 may be interconnected by a laterally extending bar 143, the end of which shows in FIG. 24-29. Pivot pad 132 is mounted to a central portion of bar 143 so that the pair of legs 135 provide support from both sides of conveyor 112 but the stacker is provided with a single, centrally-disposed pivot pad 132. Hydraulic cylinders 145 provide extension and retraction power to legs 135. With a standard-length conveyor 112, the stacker can stack bulk material to a height of 40 feet.

Figure 25:
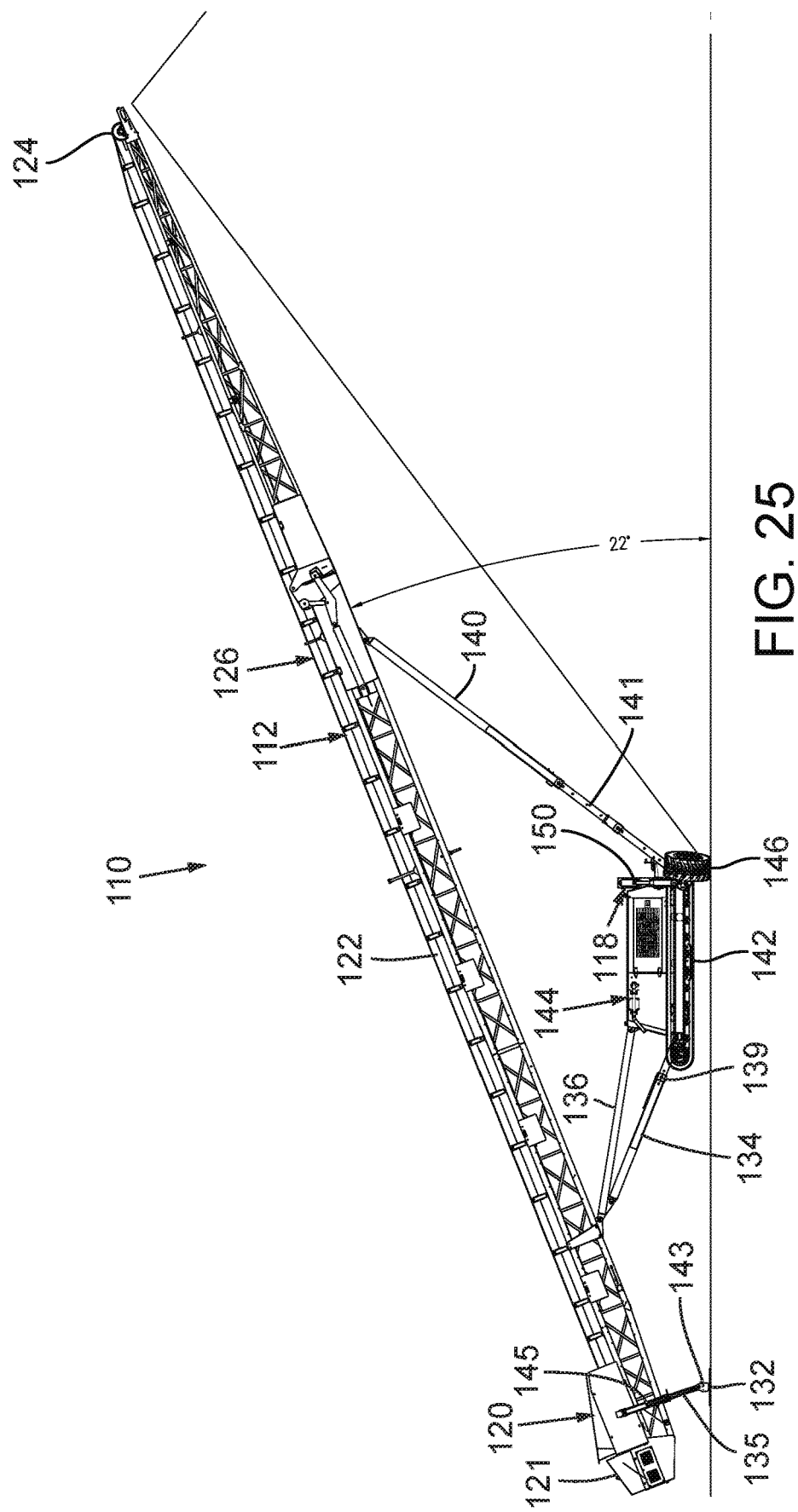
FIG. 25 is a side elevation view of the embodiment of FIG. 24 except that the mid-wheels are lowered, raising the tracks off the ground; the rear leg is also elevated, thereby reducing the angle of elevation of the conveyor.

FIG. 25 provides a good comparison, with FIG. 24, of the stacking capability of the various positions. FIG. 25 depicts legs 135 after the legs have been adjusted to an extended position, with wheels 146 being in a lowered position in which tracks 142 are elevated off the ground. In this position, with conveyor 112 again at an angle of 22 degrees, stacker 110 can stack bulk material to a height of 41 feet. While this one-foot difference may not seem significant, the additional amount of bulk material that can be in a 41-foot stack as compared to a 40-foot stack is significant.

Figure 26:
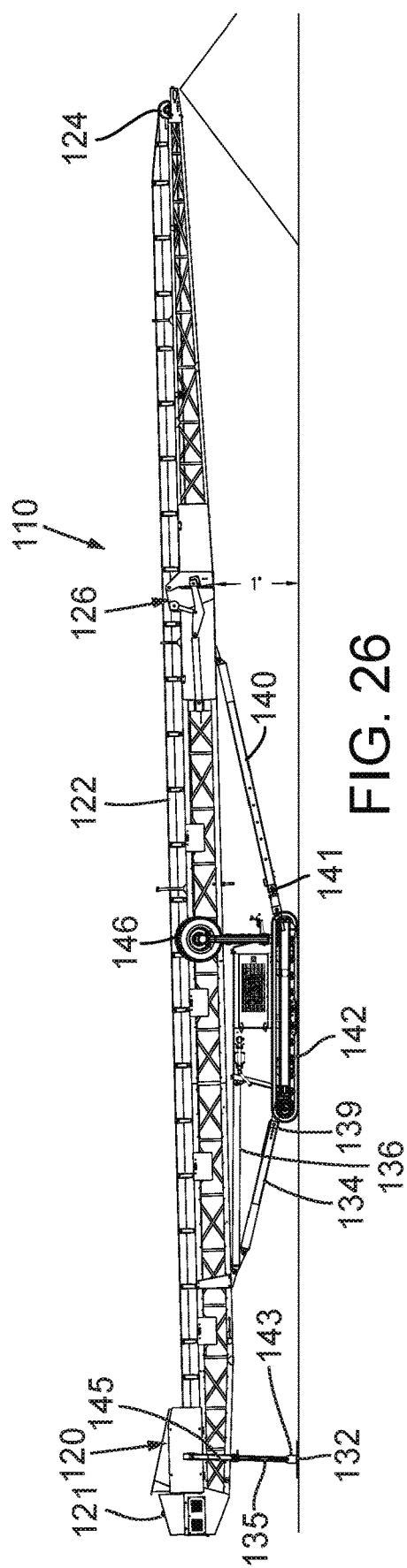
FIG. 26 is a side elevation view of the embodiment of FIG. 24, with mid-wheels up, the rear end elevated, and the conveyor at only 1 degree of elevation, such as might be used for closed rail car loading, container loading or for transfer operations to other equipment.

FIG. 26 shows the discharge end 124 having been lowered through the hydraulic retraction of the front pair of frame members 140. Legs 135 are retained in the extended position, with wheels 146 being elevated through the action of cylinders 154 (see FIG. 27), lowering tracks 142 to the ground. The resulting angle of inclination is only about 1 degree. Because of the extension of legs 135 and the resulting elevation of the rear end of conveyor 112, a stack of bulk material about 8½ feet high can be created.

Figure 27:
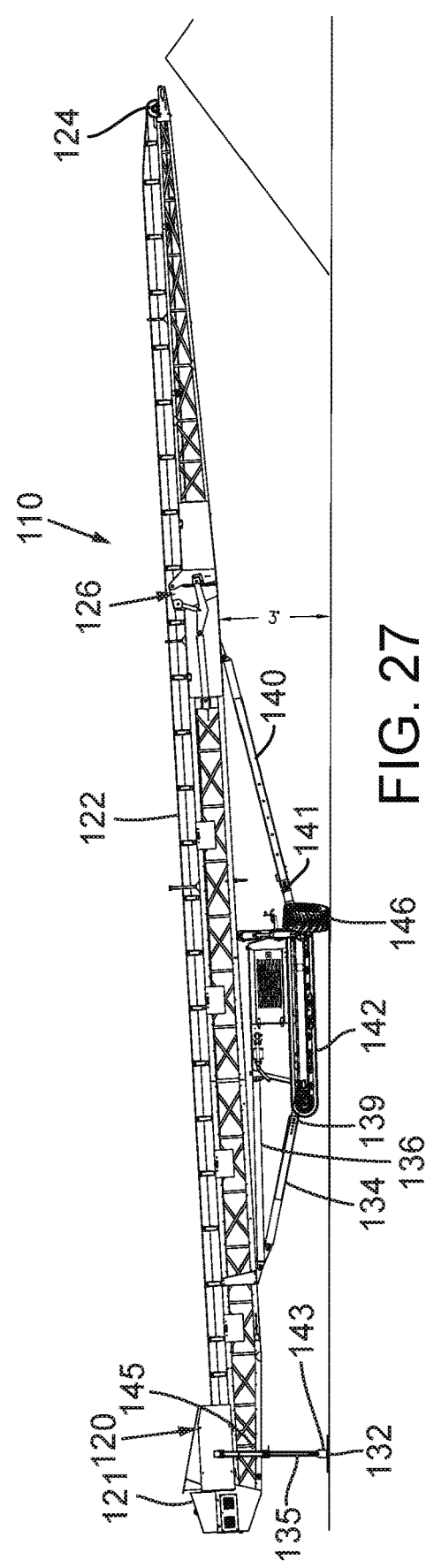
FIG. 27 is a side elevation view of the embodiment of FIG. 24, with mid-wheels down, the rear end elevated, and the conveyor at 3 degrees of elevation, such as may be used for low discharge of powder-type materials, eliminating the need for dust containing chutes.

FIG. 27 shows the discharge end 124 having been elevated slightly through the action of front frame members 140 to an angle of 3 degrees. Again, legs 135 are retained in the extended position, except that in this depiction wheels 146 have been lowered by cylinders 154 to raise tracks 142 off the ground. Because of the extension of legs 135 and the resulting reduced elevation of the rear end of conveyor 112, a stack of bulk material about 12½ feet high can be created.

Figure 28:
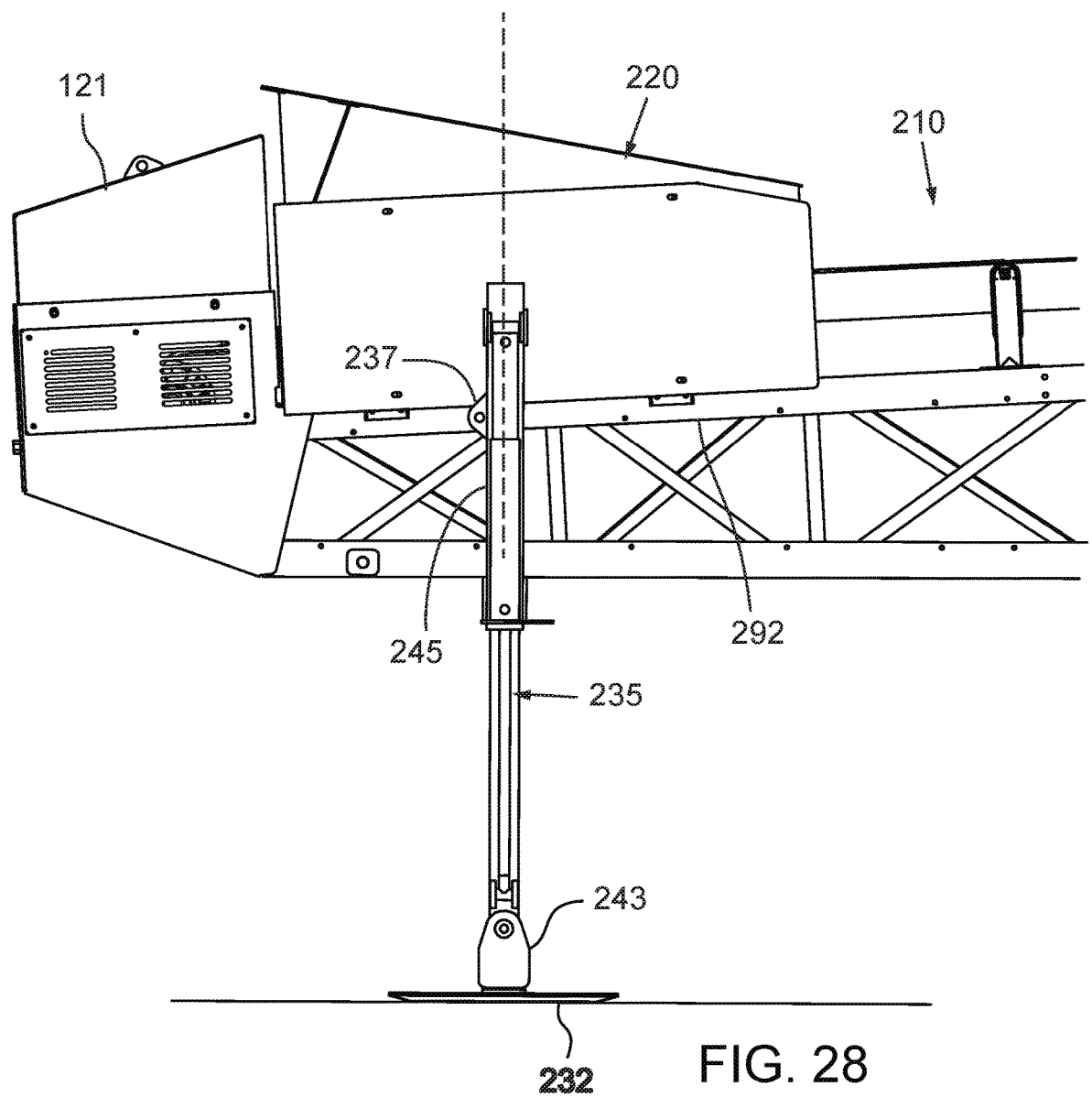
FIG. 28 is a side elevation, enlarged, fragmentary view of the rear portion of the embodiment of FIG. 24, showing a somewhat revised embodiment of the rear leg, with the rear leg fully extended and the conveyor substantially horizontal.
Figure 29:
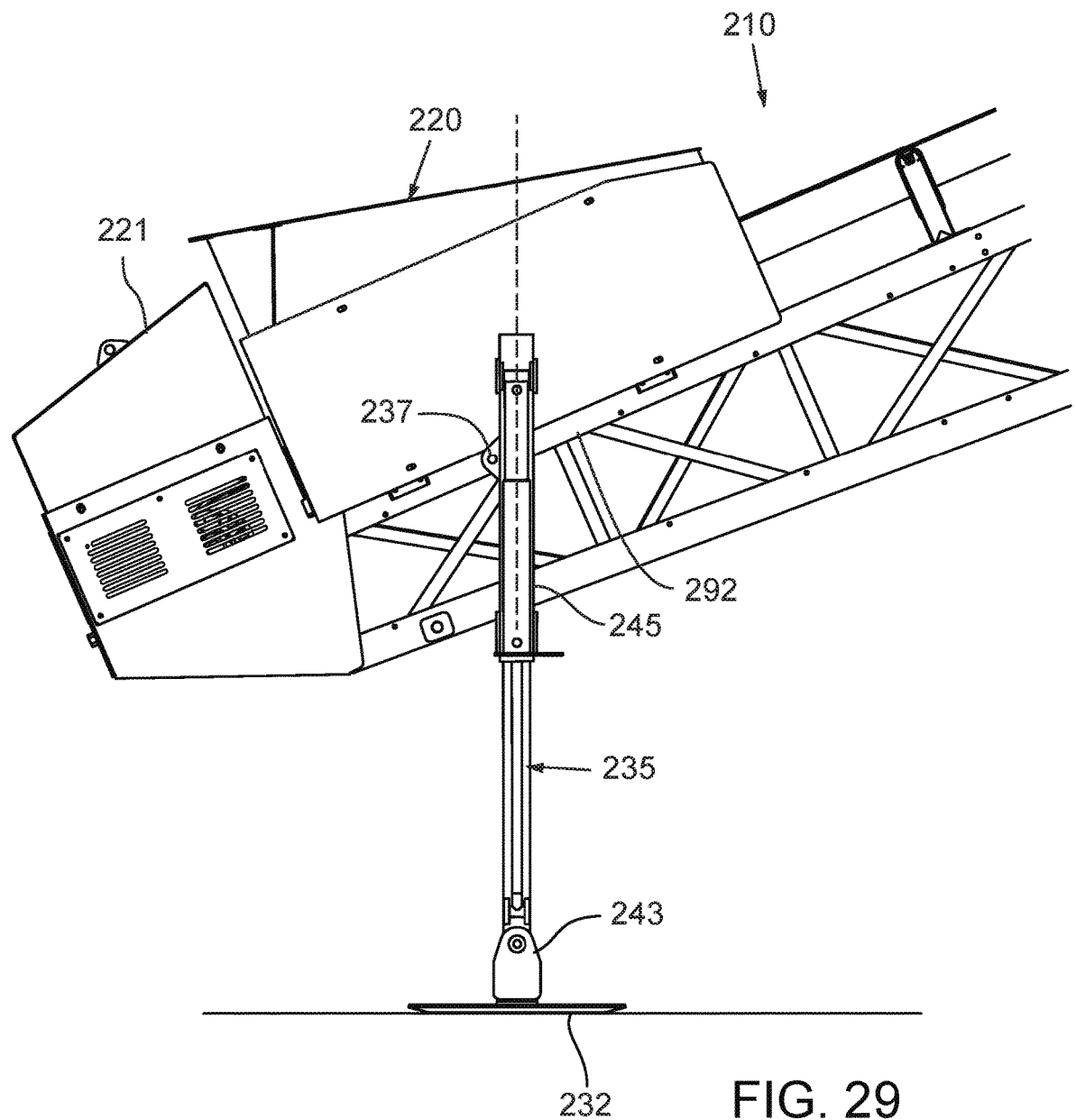
FIG. 29 is a side elevation, enlarged, fragmentary view corresponding with FIG. 28 except that the conveyor is substantially elevated.

FIG. 28 depicts a variation of stacker 110 at 210. Stacker 210 includes modified legs 135, which are therefore labeled at 235, being mounted adjacent the rear end of the conveyor. The hopper is shown at 220, and a counter-weight is shown at 221. Legs 235 include hydraulic cylinders 245 to power the extension and retraction of the legs, only one of the cylinders showing in FIG. 28 and the other side elevation views. A laterally extending bar 243 extends between legs 235, with a central pivot pad 232 mounted to it. Cylinders 245 and associated components may be designed to be strong enough to permit the rear end of stacker 210 to be raised and lowered with hopper 220 fully loaded with bulk material. Legs 235 pivot at pivot points 237 on a stacker frame 292 (one pivot point associated with each leg). The pivoting on pivot points 237 can be seen by comparing the position of legs 235 in FIGS. 28 and 29. While this pivoting is not a necessary feature of the disclosed embodiments (see the absence of the pivoting feature in legs 135 in FIG. 24), it is a desirable feature. The remaining portions of this embodiment of the stacker may be similar to stacker 110.

Figure 30:
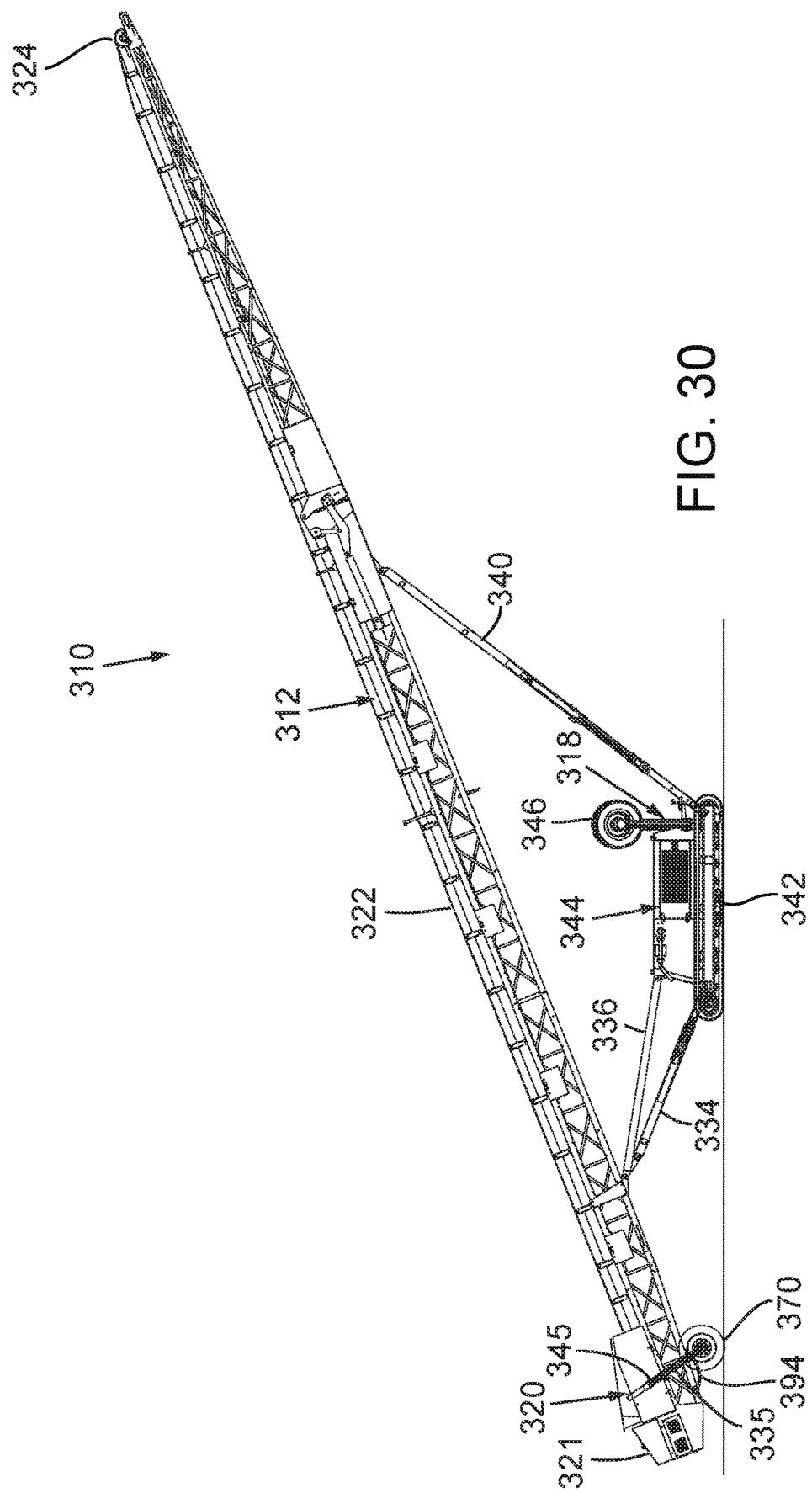
FIG. 30 is a side elevation view of a somewhat different embodiment in that it includes a rear wheel; here the mid-wheels are up, the tracks are down, and the leg to which the rear wheel is mounted is retracted or with a short effective length.
Figure 31:
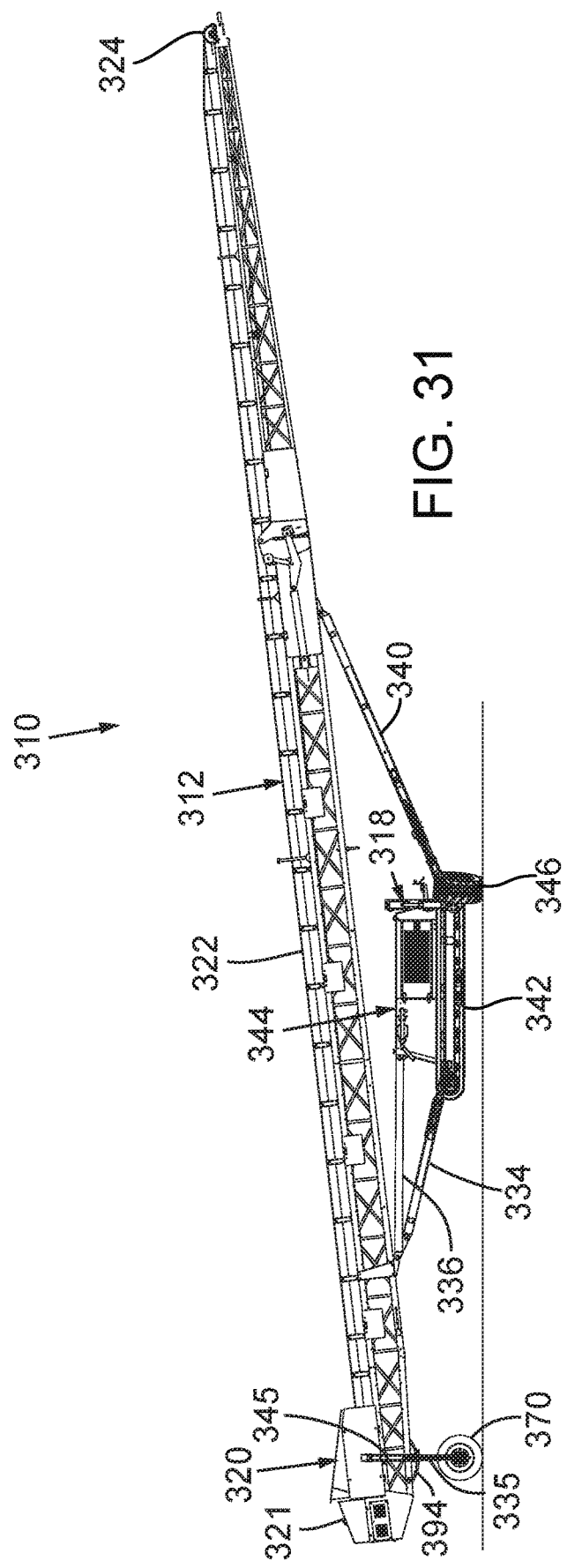
FIG. 31 corresponds with FIG. 30 except that the mid-wheels are down, the tracks are elevated, and the leg to which the rear wheel is mounted is extended or with a longer effective length.
Figure 32:
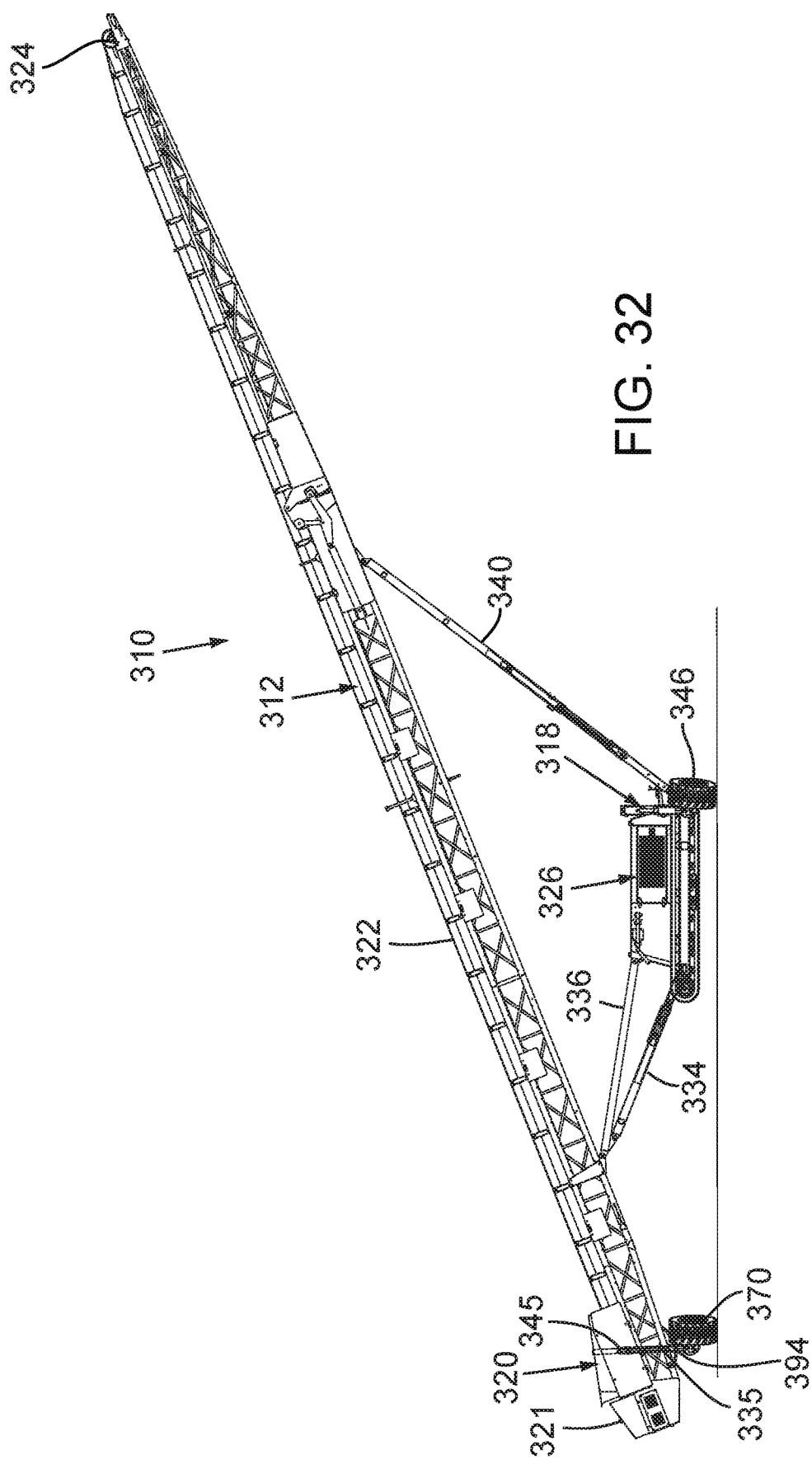
FIG. 32 corresponds with FIG. 31 except that the rear wheel extends in a lateral direction, and the leg to which it is mounted is retracted.
Figure 33:
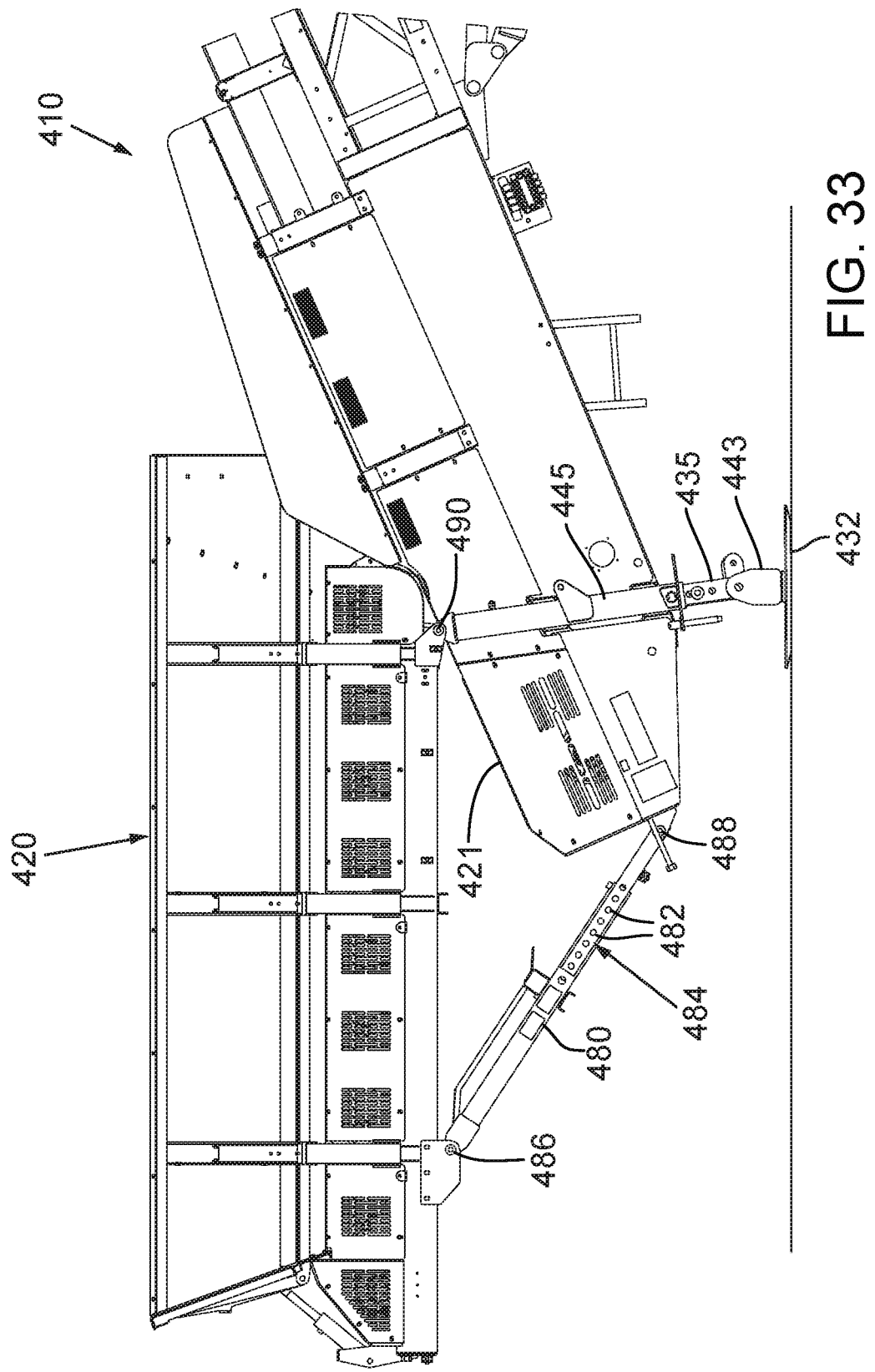
FIG. 33 is a side elevation, enlarged, fragmentary view showing the capability of the hopper to be pivotally mounted to maintain a controlled degree of elevation which, as will be explained below, is typically horizontal.
Figure 34:
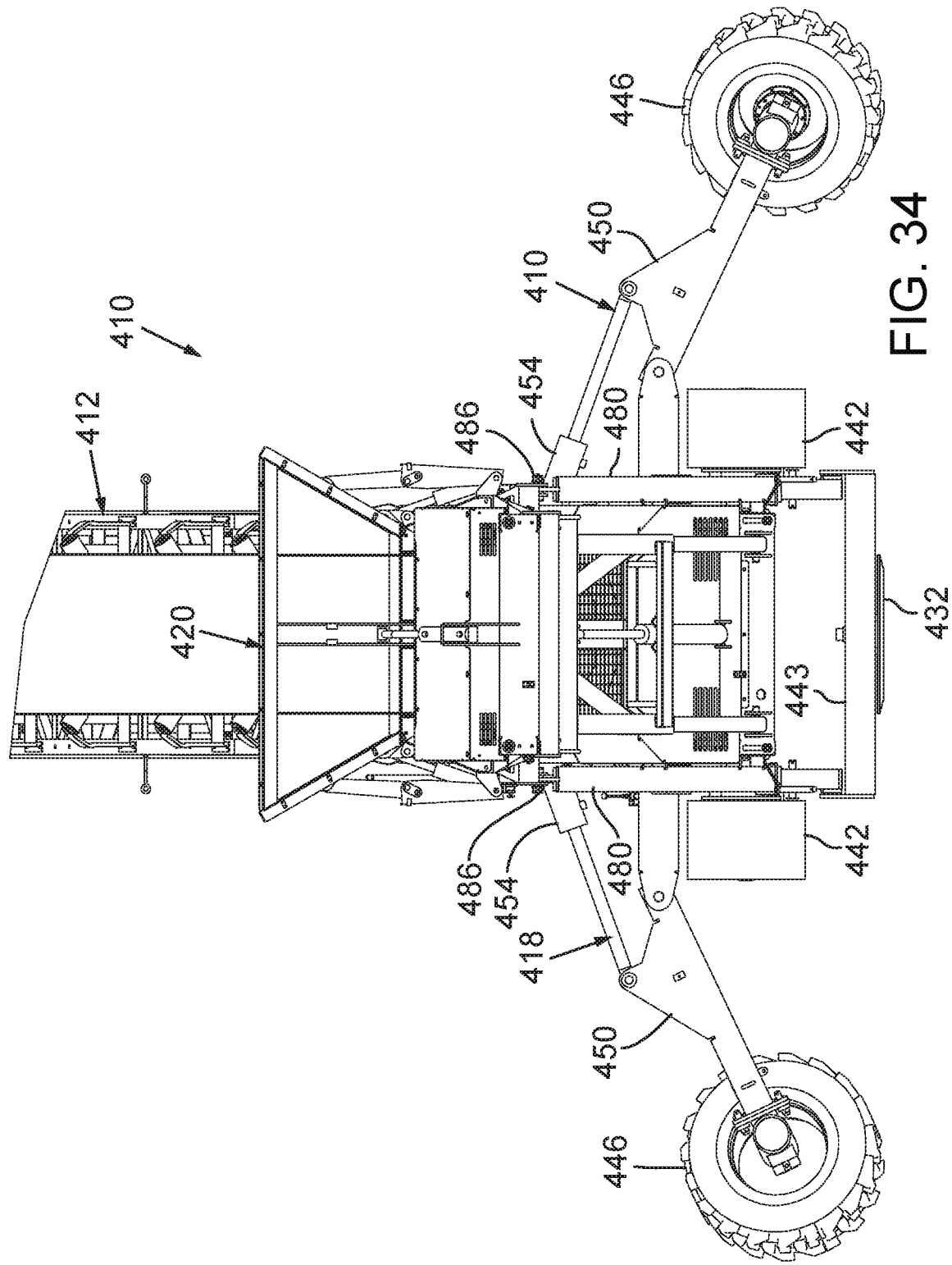
FIG. 34 is an end elevation view showing the embodiment of FIG. 33, with mid-wheels down and tracks elevated, and the conveyor in an elevated disposition.
Figure 35:
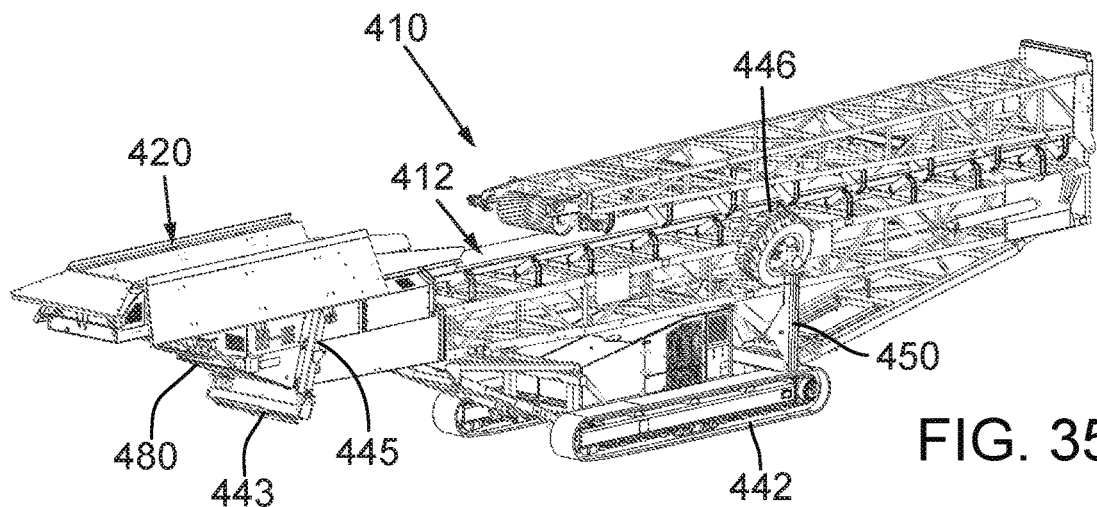
FIGS. 35-38 are more pictorial views showing the embodiment of FIGS. 33 and 34 in various positions.
Figure 36:
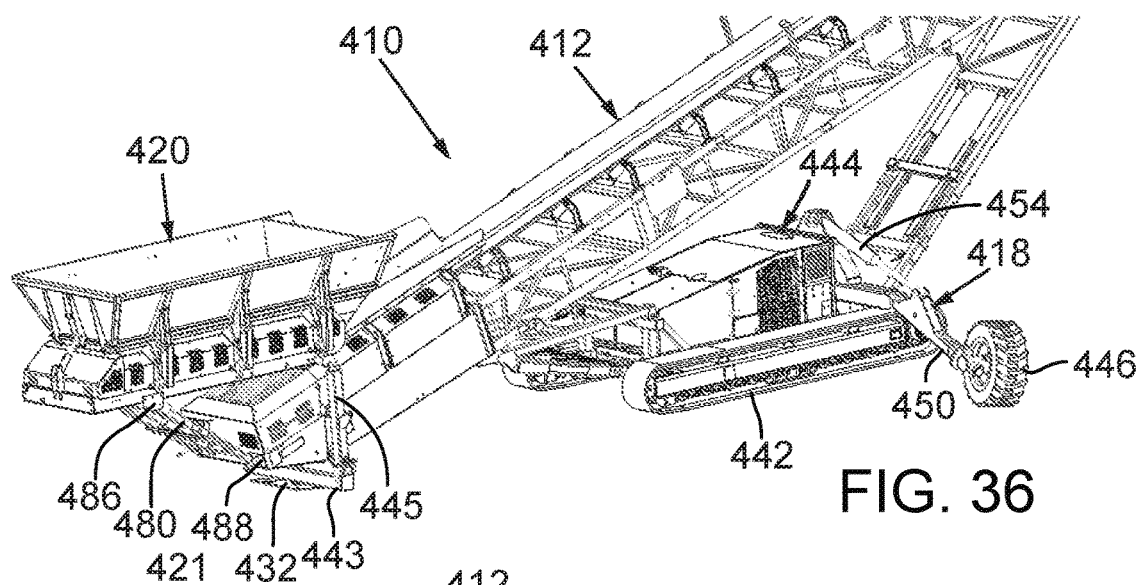
Figure 37:
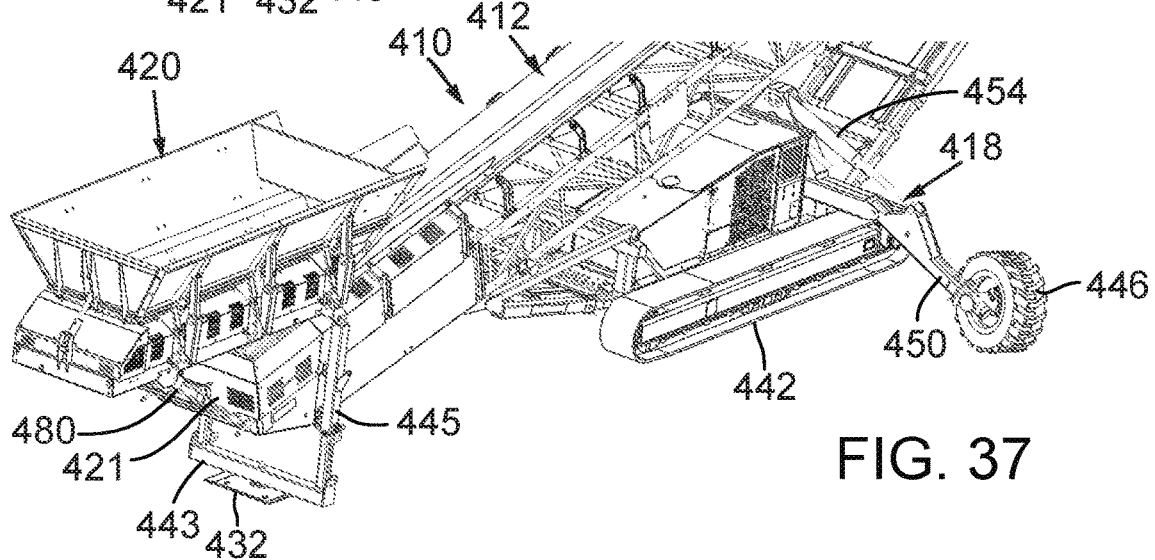
Figure 38:
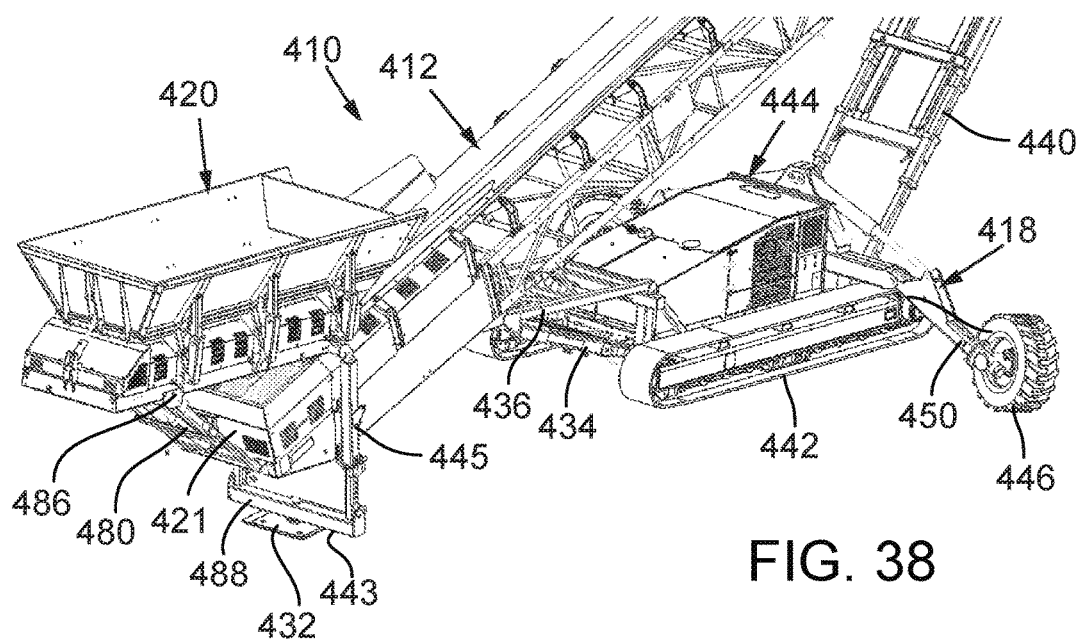
Figure 39:
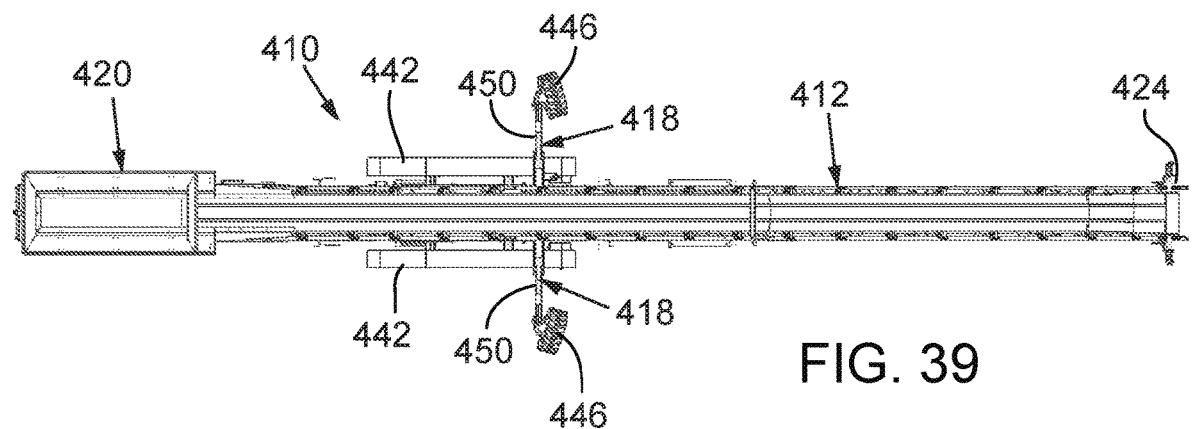
FIG. 39 is a top plan view of the stacker depicted in FIGS. 35-38.

FIGS. 30-32 depict another embodiment of the stacker, with many components that are the same as in stacker 110 and 210 but have been identified in the 300 series: stacker 310; conveyor 312; system for raising and lowering the wheels 318; hopper 320; counterweight 321; main conveyor portion 322; discharge end 324; rear, intermediate and front support frames 334, 336, and 340, respectively; legs 335; leg hydraulic cylinders 345; tracks 342; bogie 344; and pair of mid-wheels 346. A laterally extending bar also may extend between legs 335 but that bar does not show in the figures.

Stacker 310 is different from stacker 110 and 210 in that instead of a centrally-disposed pivot pad 132, stacker 310 includes a centrally-disposed pivotable rear wheel 370. This rear wheel may be mounted to a laterally-extending bar, which, again, is not shown in the figures. Rear wheel 379 is typically rotatably and pivotally mounted adjacent the rear portion of the conveyor 312, under hopper 320. Legs 335 are designed to pivot on a pivot point 337s so that they may be vertically disposed when extended, as shown in FIG. 32. An arced pivot securement member 394 may be provide to assist in securing each of the legs 335 in a variety of pivoted positions. One or more pegs (not shown) may be mounted into one of a plurality of holes in pivot securement member 394. Legs 335 may be set up for manual pivoting, or power means may be provided.

When legs 335 and rear wheel 370 are in their raised, longitudinally extended position depicted in FIG. 30, the wheel may be used to roll the rear end of stacker 310 in a longitudinal direction such as when tracks 342 are on the ground and wheels 346 are in their raised position. Or, a longitudinal disposition of rear wheel 379 will also permit such longitudinal movement when mid-wheels 346 are in their lowered, longitudinal positions. With legs 335 retracted as shown in FIG. 30, conveyor 312 typically extends at an angle in the range of 20-27 degrees.

FIG. 31 shows stacker 310 in a slightly elevated position, after leg hydraulic cylinder 345 has extended leg 335, with tracks 342 elevated, and wheel 370 on the ground in a longitudinal disposition. As with stacker 110 depicted in FIGS. 26 and 27, the elevation of the rear end of conveyor 312 means that the conveyor can extend at a lower degree of elevation than if the rear end were in the lowered position depicted in FIG. 30.

FIG. 32 depicts rear wheel 370 in a lateral position so that with mid-wheels 346 in the depicted lowered position with tracks 342 in a raised position, the entire stacker 310 can be rolled in a lateral direction.

Adjustable Hopper Angle Embodiment

FIGS. 33-39 depict another embodiment of the stacker, with many components that are the same as in stacker 110 and 310 but have been identified in the 400 series: stacker 410; conveyor 412; system for raising and lowering mid-wheels 418; hopper 420; counterweight 421; discharge end 424; pivot pad 432; rear, intermediate and front support frames 434, 436, and 440, respectively; legs 435; pivot points 437; leg hydraulic cylinders 445; tracks 442; laterally-extending bar 443; bogie 444; pair of mid-wheels 446; mid-wheel support legs 450; and hydraulic cylinders for controlling the position of the mid-wheels 454. Legs 435 may be mounted to the frame of conveyor 412 via pivot points so the legs can remain vertical but that capability has not been included in the embodiment depicted in FIG. 33.

Stacker 410 includes the capability of elevating the rear end of hopper 420 so that the hopper may be maintained at a predetermined degree of inclination regardless of the degree of inclination of the conveyor. That predetermined degree of inclination is typically horizontal, that is, with no inclination angle. However, there may be instances where some inclination is desirable. There may be other instances, such as when mulch is being conveyed, that the hopper is tilted downwardly by, say, 10-15 degrees. This downward inclination is intended to be within the definition of "inclination" or "incline" as used herein.

The angle maintenance may in some instances be set up to be automatic so that when the elevation of conveyor 412 is changed, the inclination of hopper 420 will be changed with respect to the conveyor inclination. This can be done through installation of a level sensor, which could control a pair of hopper hydraulic cylinders designed to control the elevation of the rear end of the hopper. This could be the same type of valve currently used to maintain the true vertical position of the stacker while operating the stacker on a side of a sloping hill. However, the adjustment of elevation of the hopper is normally performed manually by the operator. Raising and lowering of the angle may be controlled remotely via a remotely-controlled solenoid valve.

As with the prior embodiments of stacker 110, 210, and 310, stacker 410 may include, and typically does include, the capability of leg 435 being extendable through the action of hydraulic cylinder 445.

The depicted system for adjusting the inclination of hopper 420 includes a pair of hopper hydraulic cylinders 480, one on each side of the hopper. Hopper hydraulic cylinders 480 may include a plurality of holes 482 in which pegs (not shown) may be placed to lock the position of a pair of hopper legs 484 at a given length. Hopper legs 484 are pivotally mounted to the underside of hopper 420 at 486, and pivotally mounted to the underside of the rear of stacker 410 at 488. Hopper 420 is pivotally mounted to the upper side of stacker 410 at 490. Hopper 420 may be conventional in other respects.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A stacker for stockpiling bulk material, comprising:
   a linear conveyor having a rear portion including a hopper, and a front portion, the conveyor being designed to carry bulk material along an elevating path from a low position adjacent the rear portion to a higher position adjacent the front portion;
   at least one conveyor leg mounted below and extending from the rear portion of the conveyor and configured to contact the ground, the at least one conveyor leg including a conveyor hydraulic cylinder for increasing and decreasing the effective length of the conveyor leg, thereby raising and lowering the rear portion of the conveyor to increase and decrease a degree of inclination of the path;
   at least one hopper arm extending from the rear portion of the conveyor to a rear portion of the hopper, the at least one hopper arm including a hopper hydraulic cylinder for increasing and decreasing the effective length of the hopper arm; and
   wherein a front portion of the hopper is pivotally mounted to the conveyor so that the hopper can be pivoted with respect to the conveyor by extending or retracting the hopper hydraulic cylinder and thereby altering a degree of inclination of the hopper.

2. The stacker of claim 1 further comprising means for automatically maintaining the hopper in a horizontal disposition regardless of the degree of inclination of the path.

3. The stacker of claim 2, wherein the means for automatically maintaining the hopper in a horizontal disposition controls the hopper hydraulic cylinder.

4. The stacker of claim 1, wherein the at least one hopper arm extends from the conveyor at a point rearward of the at least one conveyor leg.

5. The stacker of claim 1, wherein the hopper is pivotally mounted to the conveyor at a pivot point and the at least one hopper arm provides sole support for the hopper rearward of the pivot point.

6. The stacker of claim 1 wherein the hopper is pivotally mounted to the conveyor at a pivot point and the at least one conveyor leg extends from adjacent the pivot point to the ground.

7. The stacker of claim 1 wherein the hopper hydraulic cylinder is mounted to an underside of the hopper in order to raise and lower an end of the hopper to alter the degree of inclination of the hopper.

8. The stacker of claim 1 wherein the hopper hydraulic cylinder extends from the rear portion of the linear conveyor to the rear portion of the hopper.

9. The stacker of claim 1 wherein the at least one leg is mounted to a frame at the rear portion of the linear conveyor and wherein the hopper is pivotally mounted to the linear conveyor at a point laterally aligned with the mounting of the at least one leg to the frame.

10. A stacker for stockpiling bulk material, comprising:
- a linear conveyor having a frame, a rear portion including a hopper, and a front portion, the conveyor being designed to carry bulk material along an elevating path from a low position adjacent the rear portion to a higher position adjacent the front portion;
- at least one leg mounted to the frame below the hopper, the at least one leg including a hydraulic jack for increasing and decreasing the effective length of the leg, thereby raising and lowering the rear portion of the conveyor to increase and decrease a degree of elevation of the path; and wherein the hopper has a rear portion and is pivotally mounted to the conveyor, with hydraulic cylinders mounted to the hopper such that extension of the hydraulic cylinders raises the rear portion of the hopper and retraction of the hydraulic cylinders lowers the rear portion of the hopper.

11. A portable radial stacker for stockpiling bulk material, comprising:
- a linear conveyor having a rear portion including a hopper, and a front portion, the conveyor being designed to carry bulk material along an elevating path from a low position adjacent the rear portion to a higher position adjacent the front portion, wherein the hopper is pivotally mounted to the conveyor with hydraulic cylinders mounted to and below the hopper and the conveyor so that the inclination of the hopper and the conveyor are altered by extending or retracting the hydraulic cylinders.

* * * * *